United States Patent
Ryu et al.

(10) Patent No.: US 12,432,810 B2
(45) Date of Patent: Sep. 30, 2025

(54) MANAGING DISCONTINUOUS RECEPTION IN SIDELINK RELAY

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/394,281

(22) Filed: Aug. 4, 2021

(65) Prior Publication Data

US 2022/0046745 A1    Feb. 10, 2022

Related U.S. Application Data

(60) Provisional application No. 63/062,342, filed on Aug. 6, 2020.

(51) Int. Cl.
| | |
|---|---|
| *H04W 76/28* | (2018.01) |
| *H04L 5/00* | (2006.01) |
| *H04W 72/04* | (2023.01) |
| *H04W 72/12* | (2023.01) |
| *H04W 72/20* | (2023.01) |
| *H04W 72/23* | (2023.01) |
| *H04W 76/15* | (2018.01) |

(52) U.S. Cl.
CPC .......... *H04W 76/28* (2018.02); *H04W 72/20* (2023.01)

(58) Field of Classification Search
CPC .............. H04W 76/28; H04W 72/042; H04W 72/1268; H04W 72/1273; H04W 72/0446; H04W 52/0216; H04L 1/1854; H04L 1/1848; H04B 7/0626
USPC ....................................................... 370/252
See application file for complete search history.

(56) References Cited

U.S. PATENT DOCUMENTS

| | | | |
|---|---|---|---|
| 2016/0126129 A1* | 5/2016 | Barker | H01L 21/67069 269/257 |
| 2016/0128129 A1* | 5/2016 | Kahtava | H04L 5/0055 370/311 |
| 2017/0118793 A1* | 4/2017 | Liu | H04W 76/28 |
| 2018/0338344 A1* | 11/2018 | Gustafsson | H04L 1/1812 |
| 2020/0413412 A1* | 12/2020 | Kim | H04W 24/08 |
| 2021/0037460 A1* | 2/2021 | Li | H04W 52/0206 |
| 2021/0037468 A1* | 2/2021 | Huang | H04W 72/044 |

(Continued)

*Primary Examiner* — Marcus Smith
*Assistant Examiner* — Jason A Harley
(74) *Attorney, Agent, or Firm* — Loza & Loza, LLP

(57) ABSTRACT

A wireless communication device can activate a discontinuous reception (DRX) mode having first inactive and active time periods allowing a user equipment (UE) to communicate sidelink control signals to another UE. The UE may receive a message from the another UE indicating an upcoming second active time period and second active time period duration for transmitting the sidelink control signals. The UE may transmit the sidelink control signals to the another UE during the second active time period duration after receiving the message from the another UE. Other aspects, features, and embodiments are also claimed and described.

30 Claims, 16 Drawing Sheets

(56) References Cited

U.S. PATENT DOCUMENTS

2021/0227622 A1\* 7/2021 Kung .................... H04W 72/20
2023/0319951 A1\* 10/2023 Cai ....................... H04L 5/0053
370/252

\* cited by examiner

MANAGING DISCONTINUOUS RECEPTION IN SIDELINK RELAY

CROSS-REFERENCE TO RELATED APPLICATIONS

The present application claims priority to U.S. Provisional Patent Application No. 63/062,342 to Ryu, et al., titled "Managing Discontinuous Reception in Sidelink Relay," filed Aug. 6, 2020, the contents of which is incorporated by reference in its entirety herein.

TECHNICAL FIELD

The technology discussed below relates generally to wireless communication networks, and more particularly, to power saving in beam-based communication scenarios (e.g., milli-meter wave beams). Some embodiments and techniques enable and provide communication devices, methods, and systems with techniques for managing discontinuous reception (DRX) during sidelink communications.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The UE may select a downlink beam on which to receive control communications, such as scheduling messages, from the base station when the UE is in a discontinuous reception (DRX) active mode. The DRX inactive mode allows the UE to remain in a low-power state, such as a sleep mode, for a period of time. The UE may periodically wake-up (e.g., perform a power-up operation) to receive a scheduling message on the selected downlink beam.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a method is disclosed of wireless communication at a user equipment (UE), the method comprising activating a discontinuous reception (DRX) mode comprising first inactive time periods and first active time periods allowing the UE to monitor receipt of control signals from a base station, and second inactive time periods and second active time periods allowing the UE to monitor receipt of sidelink control signals from another UE; and transmitting a message to the another UE to indicate an upcoming second active time period allowing the UE to monitor the receipt of the sidelink control signals.

In some examples, a user equipment (UE) is disclosed, comprising a wireless transceiver; a memory; and a processor communicatively coupled to the wireless transceiver and the memory, wherein the processor and the memory are configured to activate a discontinuous reception (DRX) mode comprising first inactive time periods and first active time periods allowing the UE to monitor receipt of control signals from a base station, and second inactive time periods and second active time periods allowing the UE to monitor receipt of sidelink control signals from another UE; and transmit a message to the another UE to indicate an upcoming second active time period allowing the UE to monitor the receipt of the sidelink control signals.

In some examples, a method is disclosed of wireless communication at a user equipment (UE), the method comprising activating a discontinuous reception (DRX) mode comprising first inactive time periods and first active time periods allowing the UE to monitor receipt of control signals from a base station, and second inactive time periods and second active time periods allowing the UE to monitor receipt of sidelink control signals from another UE; transmitting a cancel message to the base station, to cancel an upcoming first active time period; and transmitting a sidelink control message to the another UE after transmitting the cancel message, the sidelink control message indicating an upcoming second active time period allowing the UE to monitor the receipt of the sidelink control signals.

In some examples, a user equipment (UE) is disclosed, comprising a wireless transceiver; a memory; and a processor communicatively coupled to the wireless transceiver and the memory, wherein the processor and the memory are configured to activate a discontinuous reception (DRX) mode comprising first inactive time periods and first active time periods allowing the UE to monitor the receipt of control signals from a base station, and second inactive time periods and second active time periods allowing the UE to monitor the receipt of sidelink control signals from another UE; transmit a cancel message to the base station, to cancel an upcoming first active time period; and transmit a sidelink control message to the another UE after transmitting the cancel message, the sidelink control message indicating an upcoming second active time period allowing the UE to monitor the receipt of the sidelink control signals.

In some examples, a method is disclosed of wireless communication at a user equipment (UE), the method comprising activating a discontinuous reception (DRX) mode comprising first inactive time and first active time periods allowing the UE to communicate sidelink control signals to another UE; receiving a sidelink control message from the another UE indicate an upcoming second active time period and second active time period duration for transmitting the sidelink control signals; and transmitting the sidelink control signals to the another UE after receiving the message from the another UE.

In some examples, a user equipment (UE) is disclosed, comprising a wireless transceiver; a memory; and a processor communicatively coupled to the wireless transceiver and the memory, wherein the processor and the memory are configured to activate a discontinuous reception (DRX) mode comprising first inactive time and first active time periods allowing the UE to communicate sidelink control signals to another UE; receive a sidelink control message from the another UE indicating an upcoming second active time period and second active time period duration for transmitting the sidelink control signals; and transmit the sidelink control signals to the another UE after receiving the message from the another UE.

In some examples, a method is disclosed of wireless communication at a user equipment (UE), the method comprising activating a discontinuous reception (DRX) mode comprising first inactive time and first active time periods allowing the UE to communicate sidelink control signals to another UE; receiving a message from the another UE indicating an upcoming second active time period and second active time period duration for transmitting the sidelink control signals; and transmitting the sidelink control signals to another UE during the second active time period duration after receiving the message from the another UE.

In some examples, a user equipment (UE), comprising a wireless transceiver; a memory; and a processor communicatively coupled to the wireless transceiver and the memory, wherein the processor and the memory are configured to activate a discontinuous reception (DRX) mode comprising first inactive time and first active time periods allowing the UE to communicate sidelink control signals to another UE; receive a message from the another UE indicating an upcoming second active time period and second active time period duration for transmitting the sidelink control signals; and transmit the sidelink control signals to another UE during the second active time period duration after receiving the message from the another UE.

In some examples, a method is disclosed of wireless communication at a base station, the method comprising transmitting a discontinuous reception (DRX) mode configuration comprising first inactive time periods and first active time periods allowing a first user equipment (UE) to monitor receipt of control signals from the base station, and second inactive time periods and second active time periods allowing the first UE to monitor receipt of sidelink control signals from a second UE; transmitting a control message to the UE during a first active time period; and receiving sidelink data from the second UE via the first UE.

In some examples, a base station is disclosed, comprising a wireless transceiver; a memory; and a processor communicatively coupled to the wireless transceiver and the memory, wherein the processor and the memory are configured to transmit a discontinuous reception (DRX) mode configuration comprising first inactive time periods and first active time periods allowing a first user equipment (UE) to monitor the receipt of control signals from the base station, and second inactive time periods and second active time periods allowing the first UE to monitor the receipt of sidelink control signals from a second UE; transmit a control message to the UE during a first active time period; and receive sidelink data from the second UE via the first UE.

In some examples, a method is disclosed of wireless communication at a base station, the method comprising transmitting a discontinuous reception (DRX) mode configuration comprising first inactive time periods and first active time periods allowing a first user equipment (UE) to monitor receipt of control signals from the base station, and second inactive time periods and second active time periods allowing the first UE to monitor receipt of sidelink control signals from a second UE receiving a cancel message from the UE and cancelling an upcoming first active time period for the UE; and receiving sidelink data from the second UE received during a second active time period.

In some examples, a base station is disclosed, comprising a wireless transceiver; a memory; and a processor communicatively coupled to the wireless transceiver and the memory, wherein the processor and the memory are configured to transmit a discontinuous reception (DRX) mode configuration comprising first inactive time periods and first active time periods allowing a first user equipment (UE) to monitor the receipt of control signals from the base station, and second inactive time periods and second active time periods allowing the first UE to monitor the receipt of sidelink control signals from a second UE; receive a cancel message from the UE and cancelling an upcoming first active time period for the UE; and receive sidelink data from the second UE received during a second active time period.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
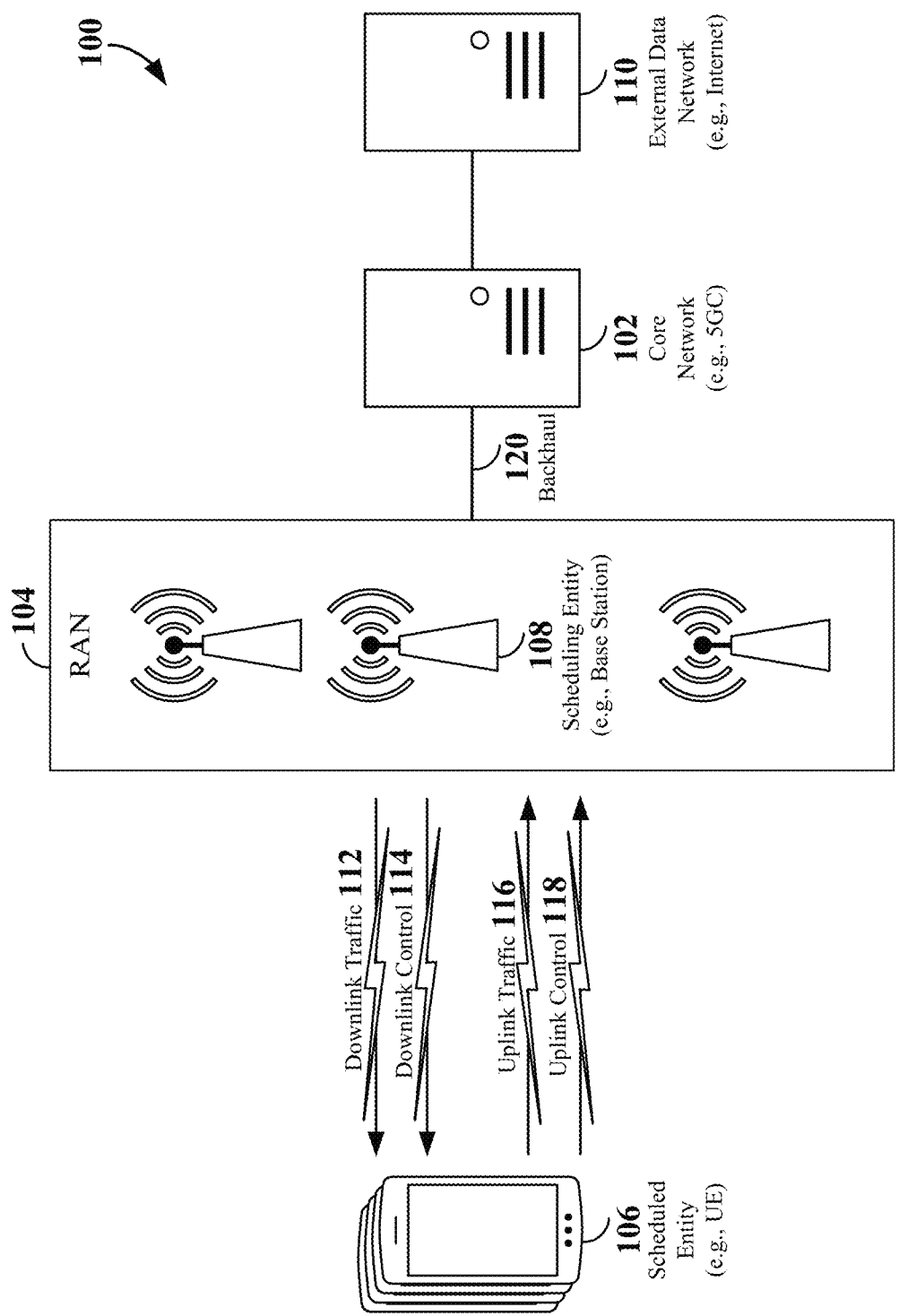
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated arrangements, end-user devices, etc. of varying sizes, shapes, and constitution.

For frequency division duplex (FDD) full duplex (FD) communications to be realized, self-interference from a transmitter of a user equipment (UE) or a base station should be minimized to avoid saturating sensitive amplifiers and front ends of receivers of the UE and base station. To isolate a signal transmitted by a transmitter from a receiver, the frequency band used by the transmitter may be separated from the frequency band used by the receiver. The gap between the two frequency bands may be referred to as a guard band. For time division duplex (TDD) half-duplex (HD) communications, the need for a guard band is obviated because the transmission band and the reception band are one and the same. A TDD HD scheme therefore uses less bandwidth than an FDD FD scheme, by using the same sub-channels for transmission and reception at separate times.

Work is advancing on the simultaneous use of the same frequency resources for both UL and DL in a given time slot. Such use may be referred to herein as TDD full duplex or TDD FD. Scheduled entities (e.g., UEs or other wireless communication devices) that are able to operate in a full duplex mode may be able to use TDD FD to increase the amount of data transferred in comparison to TDD HD, because, as with 1-DD 1-D, data may be transmitted and received at the same time, while in contrast to FDD FD, the data may be transmitted and received at the same frequency.

Scheduling entities (e.g., gNBs or other network access nodes) may be early adopters of TDD FD. In this way, the radio access networks will be ready to provide the improved use of bandwidth for scheduled entities as scheduled entities that are TDD FD capable are brought into use. However, not all scheduled entities will be able to implement TDD FD operation. For example, some scheduled entities may have an inexpensive front end that includes a switch that couples an antenna to either the scheduled entity receiver or the scheduled entity transmitter, depending on the state of the switch. Such designs minimize cost and complexity by doing away with relatively expensive and complex multiplexors and/or circulators at the front ends of scheduled entities.

Scheduling entities that are able to conduct TDD FD operations may be oblivious to the capabilities of the scheduled entities they serve and may seek to configure time slots for TDD FD operation. To configure a time slot for TDD FD operation, the scheduling entity may configure a time slot (including a set of OFDM symbols) for simultaneous use of the same frequency resource (e.g., use of one new radio operating band radio channel currently designated for TDD HD operation) for both transmission and reception. An OFDM symbol for TDD FD use may be referred to as a downlink-uplink (DU) symbol. A DU symbol may be different from an uplink (UL) symbol, a downlink (DL) symbol, and a flexible (F) symbol. For example, the DL symbol and the UL symbol are reserved for DL transmission and UL reception, respectively. DL transmission and UL reception are examples of unidirectional communication. DL transmission and UL reception may occur at the same time at different frequencies (as in the case of FDD FD) or at different times at the same frequency (as in the case of TDD HD), but do not occur at the same time at the same frequency (as in the case of TDD FD). The F symbol is interpreted as either a UL symbol or a DL symbol and as such has the same characteristics of either a DL symbol or a UL symbol. An F symbol does not combine the characteristics of the UL symbol and the DL symbol.

Accordingly, a scheduling entity may configure a slot with at least one downlink-uplink (DU) symbol reserved for both downlink transmission to and uplink reception from a scheduled entity (e.g., a UE or other wireless communication device) at the same time at the same frequency. In such a circumstance, the behavior of a non-TDD FD scheduled entity (referred to herein as a scheduled entity, a half-duplex scheduled entity, a full duplex-aware scheduled entity, an FD-aware scheduled entity, a half-duplex UE, an HD UE, a full duplex-aware UE, or an FD-aware UE) may be undefined. According to some aspects, HD UE behavior when encountering a slot formatted with at least one DU symbol may be unchanged compared to a legacy behavior where the HD UE reads only a SlotFormatCombinationID (e.g., 802 of FIG. 8).

Defining the behavior of a non-TDD FD UE when encountering DU symbols may enable the non-TDD FD UE (e.g., new or legacy TDD HD UEs, or full duplex-aware UEs) to continue operations in wireless network environments that begin to use TDD FD transceivers and may provide for ongoing and future use of lower cost non-TDD FD UEs in a TDD FD environment.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmission. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
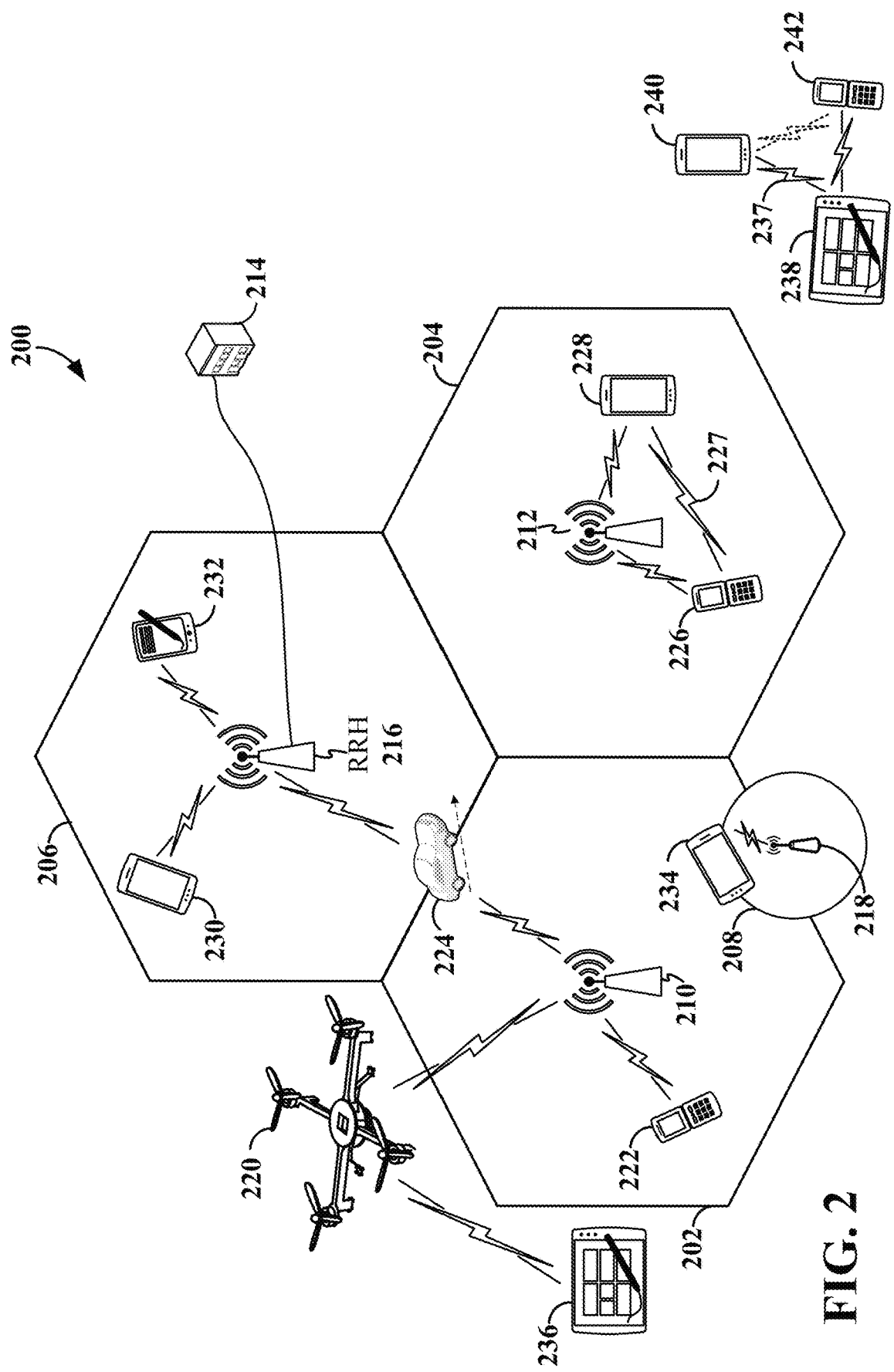
FIG. 2 is a conceptual illustration of an example of a radio access network according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242)

may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex or TDD FD.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
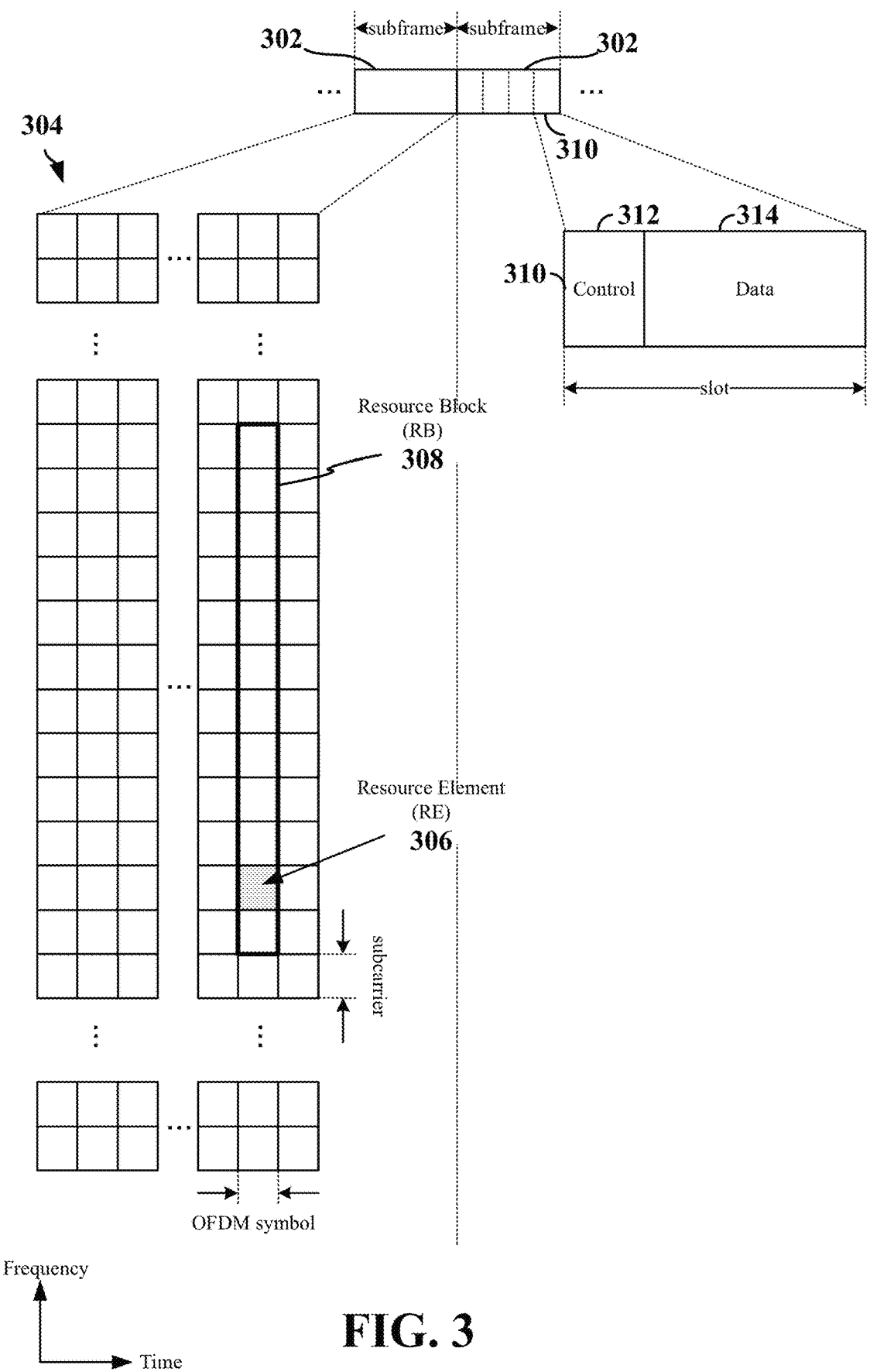
FIG. 3 is a diagram illustrating an example of a frame structure for use in a radio access network according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH)

within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
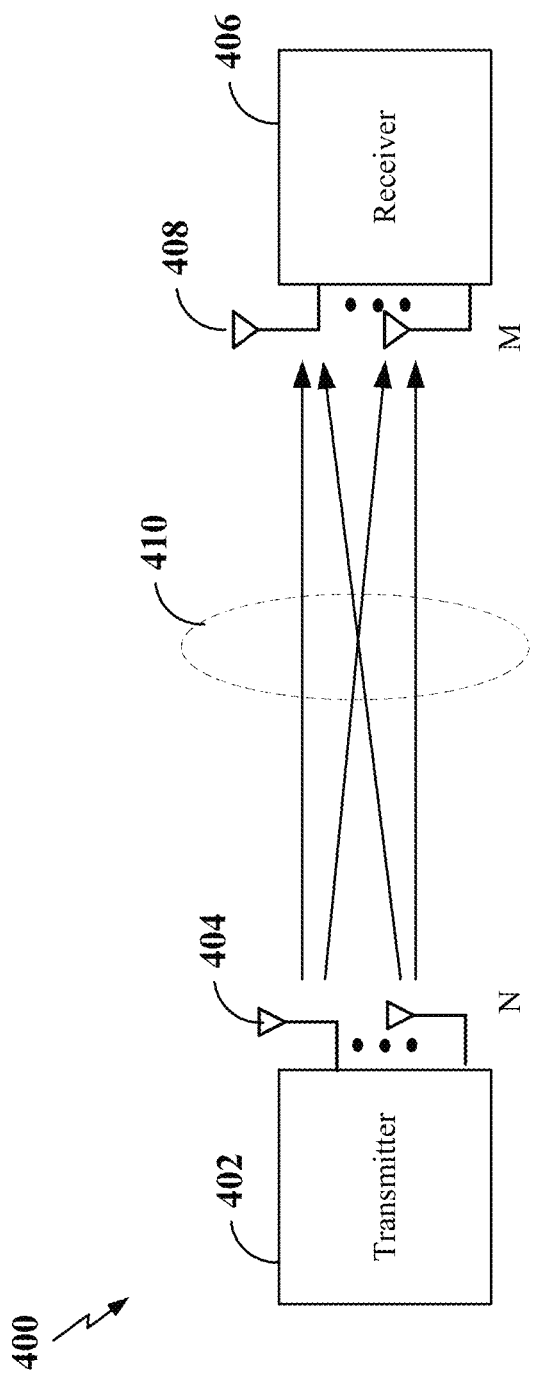
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO wireless communication system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as an SSB or CSI-RS, on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
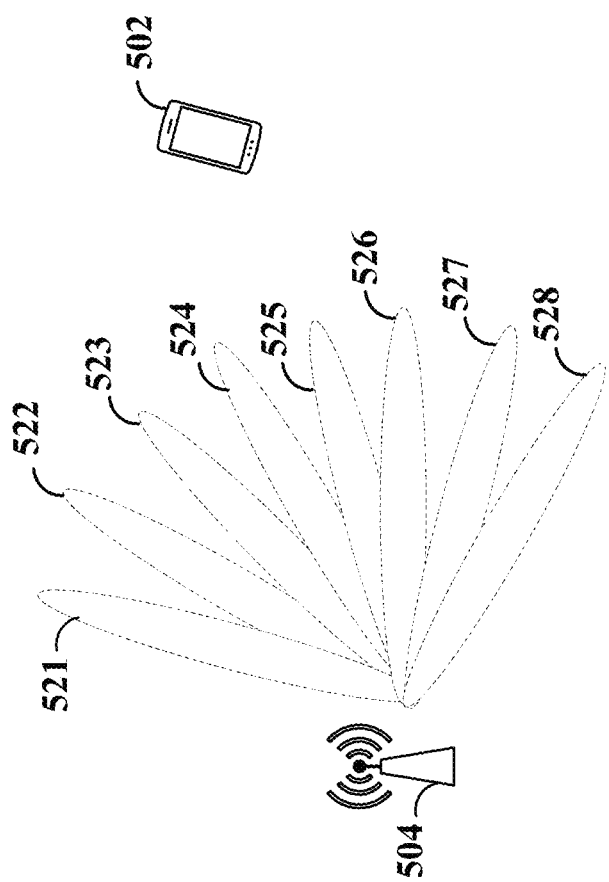
FIG. 5 is a diagram illustrating an example of communication between a radio access network (RAN) node and a wireless communication device using beamforming according to some aspects.

FIG. 5 is a diagram illustrating communication between a radio access network (RAN) node 504 and a wireless communication device 502 using downlink beamformed signals according to some aspects of the disclosure. The RAN node 504 may be any of the base stations or scheduling entities illustrated in FIGS. 1 and 2, and the wireless communication device 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The wireless communication device 502 searches for and identifies the beams based on the beam reference signals. The wireless communication device 502 then performs beam measurements (e.g., RSRP, SINR, RSRQ, etc.) on the beam reference signals to determine the respective beam quality of each of the beams. In examples in which the wireless communication device 502 is in an RRC connected state, the wireless communication device 502 may generate and transmit a beam measurement report, including the respective beam index and beam measurement of each beam 521-528 to the RAN node 504. The RAN node 504 may then determine the downlink beam (e.g., beam 524) on which to transmit unicast downlink control information and/or user data traffic to the wireless communication device 502. In some examples, the selected downlink beam has the highest gain from the beam measurement report. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the wireless communication device 502. In some examples, the RAN node 504 may derive the downlink beam based on a combination of the beam measurement report and uplink measurements.

In examples in which the wireless communication device 502 is an RRC idle state, the wireless communication device 502 may use the beam measurements to select a downlink beam on which to receive broadcast communications from the RAN node 504. The broadcast communications may include, for example, paging messages transmitted from the RAN node 504 to the wireless communication device 502 when new data arrives for the wireless communication device 502 at the network. In some examples, a paging message may be broadcast by the RAN node 504 over multiple downlink beams. The paging message may then be received by the wireless communication device 502 on the selected downlink beam.

In the RRC idle mode, the wireless communication device 502 may enter a discontinuous reception (DRX) mode (DRX idle mode) to reduce power consumption. The DRX idle mode allows the wireless communication device 502 to remain in a low-power state, such as a sleep mode, for a period of time. The wireless communication device 502 may periodically wake-up (e.g., perform a power-up operation) to receive a page on the selected downlink beam.

Figure 6:
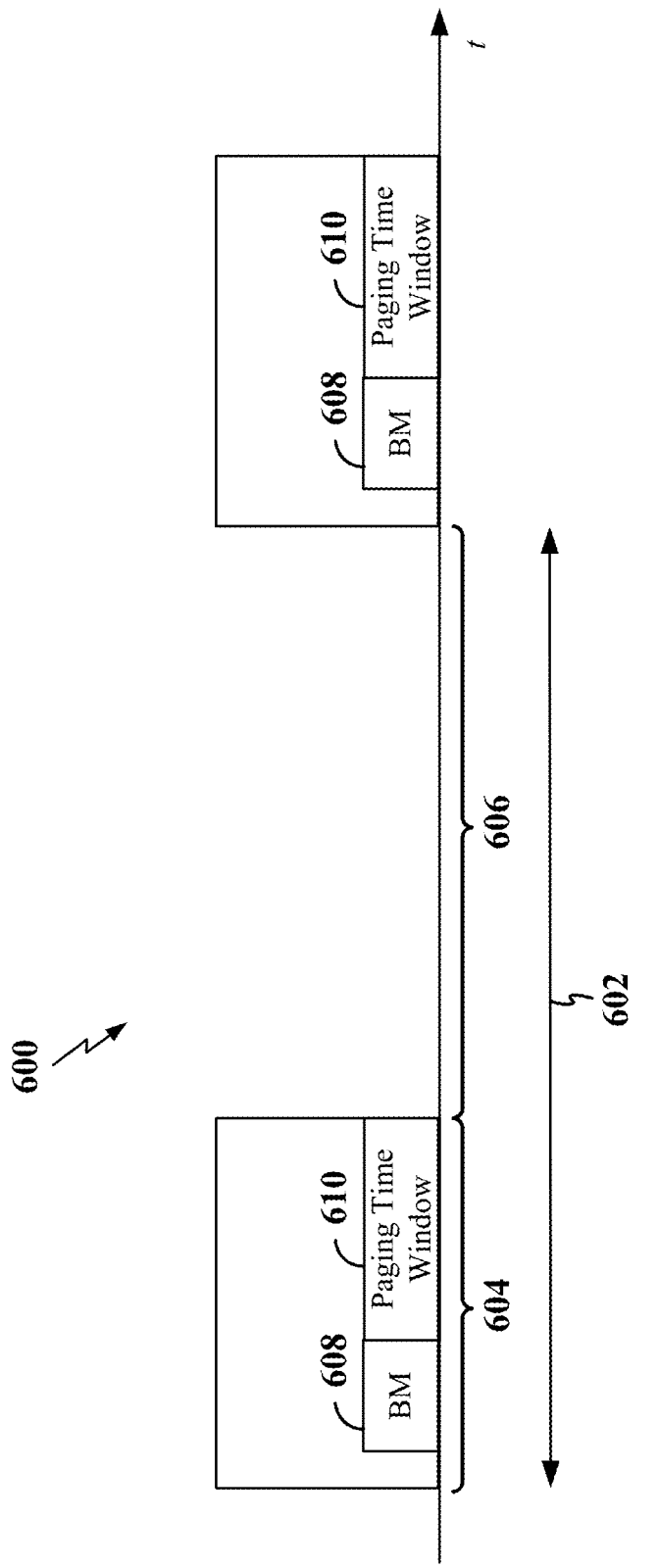
FIG. 6 is a diagram illustrating an example of a discontinuous reception (DRX) idle mode as implemented on a wireless communication device according to some aspects.

FIG. 6 is a diagram illustrating an example of a DRX idle mode as implemented on a wireless communication device according to some aspects. The DRX idle mode is characterized by a number of consecutive DRX cycles 602 in time (t). The duration of each DRX cycle 602 may be set by the network based on one or more DRX parameters, such as a requested DRX cycle length provided by the wireless communication device during an initial attach procedure.

Each DRX cycle 602 includes a DRX ON duration 604 and a DRX OFF duration 606. Here, the DRX cycle length (or DRX cycle duration) is equal to the time between the start of one DRX ON duration 604 and the start of the next DRX ON duration 604. The DRX OFF duration 606 corresponds to a period of inactivity where the wireless communication device does not communicate with the wireless communication network (e.g., the wireless communication device does not transmit any information to or receive any information from the wireless communication network). During the DRX OFF duration 606, the wireless communication device may enter a sleep state or low-power state to reduce power consumption.

Upon entering the DRX ON duration 604, the wireless communication device wakes-up by performing a power-up operation. The wireless communication device may then enter a beam measurement (BM) period 608. During the BM period 608, the wireless communication device searches for and identifies downlink beams using received beam reference signals (e.g., SSB, CSI-RS, etc.). In addition, the wireless communication device performs beam measurements (e.g., RSRP, SINR, RSRQ, etc.) on the beam reference signals to determine the respective beam quality of each of the beams. To facilitate beam search and measurement during the BM period 608, the periodicity of the BM period 608 maps to the beam reference signal periodicity (e.g., SSB transmission periodicity).

Following the BM period 608, the wireless communication network may designate a paging time window 610 within which the wireless communication device may receive a paging message. For example, the paging time window 610 may correspond to a normal paging cycle (e.g., 1.28 seconds) utilized in the wireless communication network. At the end of the paging time window 610, the wireless communication device may again enter a sleep state or low-power state for the DRX OFF duration 606.

In the example shown in FIG. 6, the periodicity of the paging time window 610 is selected to follow the periodicity of the BM period 608. In other examples, the BM period 608 may have a different periodicity that may or may not coincide with the paging time window 610. However, the wireless communication device may suffer a power penalty if the BM period 608 is separated in time from the paging time window 610, thus resulting in an additional DRX ON duration to perform beam search and measurement. Therefore, in various aspects of the disclosure, the BM period 608 occurs during the same DRX ON duration 604 as the paging time window 610 and precedes the paging time window 610 to facilitate beam selection for enhanced page performance.

Figure 7:
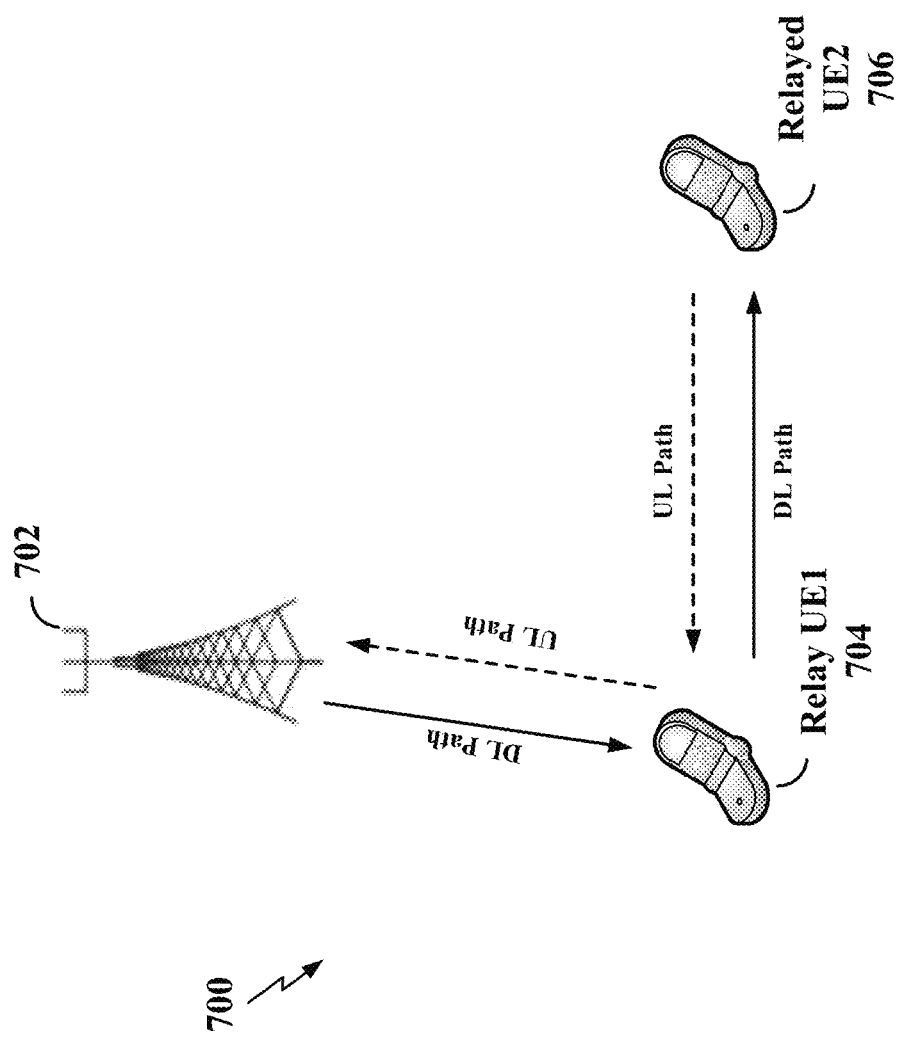
FIG. 7 shows a system for sidelink communication according to some aspects of the present disclosure.

FIG. 7 shows a system 700 for sidelink communication according to some aspects of the present disclosure. Also known as "device-to-device" (D2D) and/or "vehicle-to-everything" (V2X) communication, sidelink communication shares similarly with communication of a UE (e.g., 704) with a gNB (e.g., 702), except that sidelink enables the communication of the devices (704, 706) directly between each other. Such sidelink communication may be unicast (a connection between two UEs) or sidelink groupcast (a one-to-many sidelink message) or sidelink broadcast (a one-to-whoever can hear sidelink message). For resource allocation, sidelink transmission may be configured with two modes of allocation including Mode 1, where sidelink resources are scheduled by a gNB 702, and Mode 2, where a UE 704 may autonomously select sidelink resources from one or more (pre-)configured sidelink resource pools based on a channel sensing mechanism.

Mode 1 supports both dynamic grants and configured grants. For dynamic grants, when the traffic to be sent over sidelink arrives at a relay UE 704, the UE may launch the four-message exchange procedure to request sidelink resources from gNB 702 (similar to the case of uplink transmissions). During the resource request procedure, the gNB 702 may allocate a sidelink radio network temporary identifier (SL-RNTI) to the relay UE 704. If this sidelink resource request is granted by the gNB 702, then the gNB 702 may indicate the resource allocation for the PSCCH and the PSSCH in the downlink control information (DCI) conveyed by PDCCH. The relay UE 704 then indicates the time-frequency resources and the transmission scheme of the allocated PSSCH in the PSCCH, and launches the PSCCH and the PSSCH on the allocated resources for sidelink transmissions with the relayed UE 706.

A configured grant may be utilized in operating environments having traffic with a strict latency requirement, since performing a four-message exchange procedure to request sidelink resources may induce unacceptable latency. In this case, prior to the traffic arrival, the relay UE 704 may perform the four-message exchange procedure with the gNB 702 and request a set of resources. If a grant can be obtained from the gNB 702, then the requested resources are reserved in a periodic manner Upon traffic arriving at the relay UE 704, the UE may launch the PSCCH and the PSSCH on the upcoming resource occasion for grant-free transmissions. Since the PSCCH and the PSSCH may be multiplexed both in the time and frequency domains, the relay UE 704 may sample signals over all the subchannels at every slot for detection of the PSCCH. These sampled signals may be stored in the memory, and the relay UE 704 solves CRC of all signals in the memory to detect the PSCCH. If the PSCCH can be detected, the relay UE 704 is able to decode the PSSCH, stored in the memory accordingly.

In the time domain, the time gap between the PSSCH and the PSFCH for sidelink may be configured. However, when the relay UE 704 sends the HARQ ACK/NACK on the PSFCH, only the relayed UE 706 may have the capability to receive such ACK/NACK messages, and the gNB 702 may not receive this feedback transmission. As a consequence, the gNB 702 may not know whether to further allocate resources for a relay UE 704 to retransmit a TB or not. To obtain resources of the PSSCH for subsequent retransmissions, a relay UE 704 may forward the sidelink HARQ ACK/NACK message to the gNB 702 when a feedback message is received on the PSFCH. To further obtain resources for the relay UE 704 to send the sidelink HARQ ACK/NACK to the gNB 702, the gNB 702 may allocate one physical uplink control channel (PUCCH) occasion after the last resource in the PSSCH set for initial sidelink transmissions. When a NACK is received by the gNB 702, the gNB 702 may further allocate PSCCH and PSSCH resources for sidelink retransmissions, and this resource allocation may be indicated in the DCI in the case of dynamic grant. Alternatively, a transmitting UE can launch the TB retransmission through the reserved the PSCCH and the PSSCH in the case of configured grant.

In the Mode 2 resource allocation, when traffic arrives at a relay UE 704, the relay UE 704 may autonomously select resources for the PSCCH and the PSSCH. To further minimize the latency of the feedback HARQ ACK/NACK transmissions and subsequently retransmissions, the relay UE 704 may also reserve resources for PSCCH/PSSCH for retransmissions. To further enhance the probability of successful TB decoding at once and thus suppress the probability to perform retransmissions, the relay UE 704 may perform blind retransmission by repeating the TB transmission along with the initial TB transmission. As a result, when traffic arrives at the relay UE 704, then the relay UE 704 may select resources for the PSSCH associated with the PSCCH for initial transmission and blind retransmissions, or the PSSCH associated with the PSCCH for retransmissions. Since the relay UE 704 in sidelink transmissions should autonomously select resources using resource selection procedures (e.g., resource sensing, resource (re-) selection to prevent different transmitting UEs from selecting the same resources.

As discussed above, a UE (e.g., 704, 706) may be in an inactive mode (sleep) in some time periods, and periodically go into active (awake) in others to receive control signal from gNB 702 in order to save power. During inactive time, the relay UE 704 is not monitoring for control signal from gNB 702, and will begin monitoring for control signal from gNB 702 during active time. If relay UE 704 wants to make an UL transmission, the UE 704 may go into active time from inactive time during any time period to transmit to send a scheduling request. The gNB 702 may be configured to store the active and inactive time periods for the relay UE 704 and will transmit control signals to the relay UE 704 only during active time periods, and not during an inactive time. DRX cycles are controlled by gNB and include active and inactive times. When the relay UE 704 receives control signal in active time, it may also be configured to extend active time to receive further control signals. During extended active time, the relay UE 704 will stay awake for a longer time duration, known to gNB 702, even if the relay UE 704 is scheduled to go back to sleep mode In order to configure DRX cycles for both relay UE 704 and relayed UE 706 for sidelink relay, the relayed UE 706 should monitor for SCI from relay UE 704 to obtain a downlink connection from gNB 702 during its active times. For sidelink, the relay UE 704 monitors for SCI/SR from relayed UE 706 (e.g., for establishing UL from UE 706 to gNB 702) during its active times, and also monitors for DCI for relayed UE 706 DL from gNB 702 during its active time periods. In some examples, relay UE 704 may be configured to receive data and other information from one node at a time (i.e., either from gNB 702 or UE 706)

Figure 8:
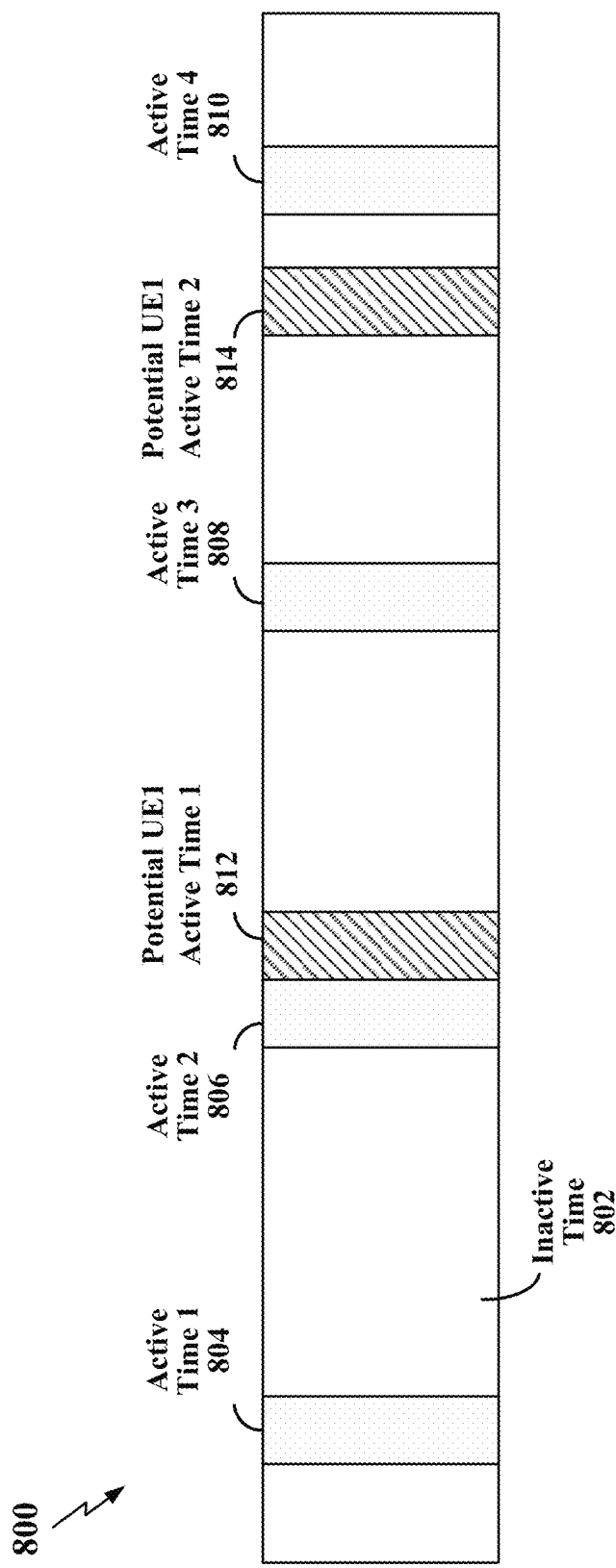
FIG. 8 shows a signal diagram illustrating active and inactive time periods during a DRX cycle for a relay UE according to some aspects.

FIG. 8 shows a signal diagram 800 illustrating active and inactive time periods during a DRX cycle for a relay UE (e.g., 704) according to some aspects. In this example, the DRX cycle includes inactive time periods 802 and a plurality of active time periods 804, 806, 808 and 810 in which the relay UE may monitor, for example, PDCCH from a gNB (e.g., 702). The relay UE may also be configured with potential active time periods 812, 814 for the relayed UE (e.g., 706) for monitoring SCI from the UE, for example, when the relayed UE (e.g., 706) has uplink traffic for the relay UE (e.g., 704) to transmit to the gNB (e.g., 702). In some example, if the relay UE is configured to receive data or control from one node at a time, the active times for receiving control signals from gNB (e.g., 804, 806, 808 and 810) should not overlap with potential active times for receiving control signals from the relayed UE (e.g., 812, 814). However, even if the relay UE is configured to receive data or control simultaneously from the gNB and the relay UE, overlap of the active times for gNB and the relay UE should be avoided to reduce potential signal error.

Figure 9:
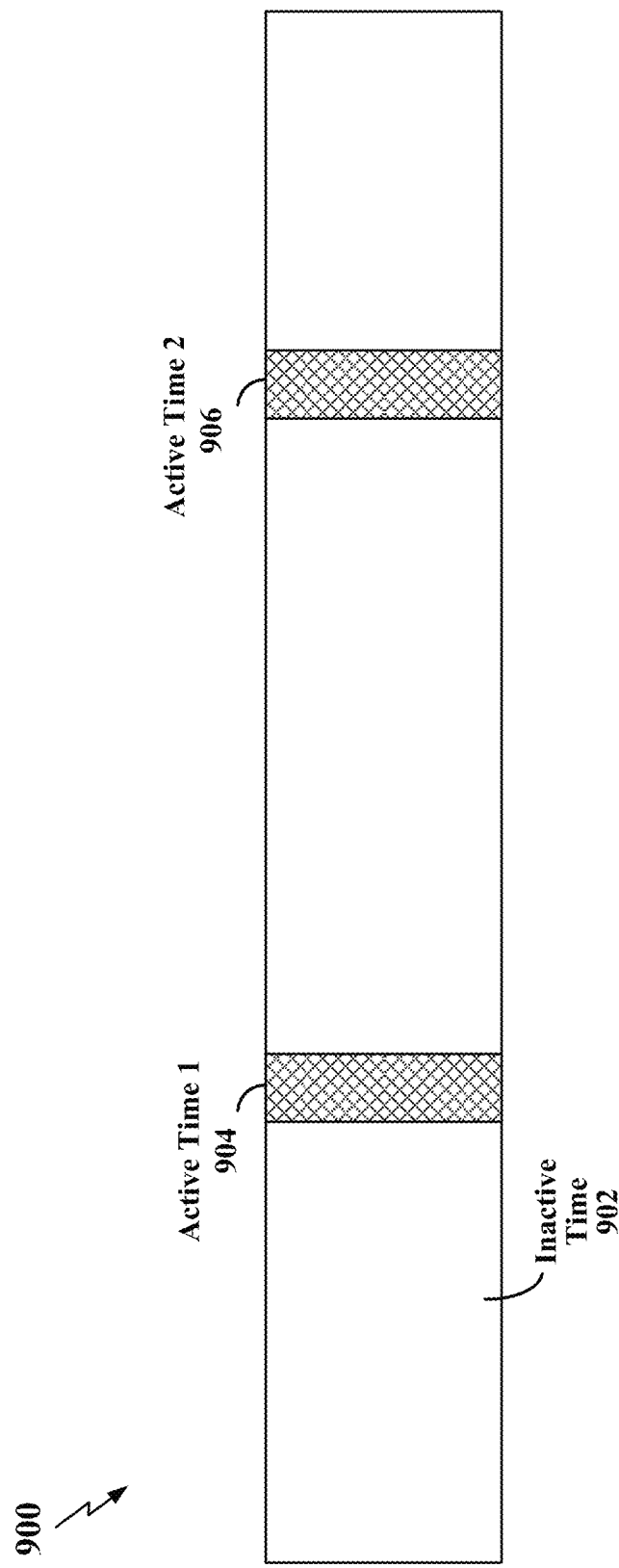
FIG. 9 shows a signal diagram illustrating active and inactive time periods during a DRX cycle for a relayed UE for sidelink communications according to some aspects.

FIG. 9 shows a signal diagram 900 illustrating active and inactive time periods during a DRX cycle for a relayed UE (e.g., 706) for sidelink communications according to some aspects. In this example, the DRX cycle includes inactive time periods 902 and a plurality of active time periods 904, 906 in which the relayed UE may monitor, for example, SCI from the relay UE (e.g., 704), in configurations where the relay UE has DL traffic to be relayed to the relayed UE (e.g., 706). Considering the examples of FIG. 8 and FIG. 9 together, the gNB (e.g., 702) may be configured to store active times for the relay UE (e.g., 704) for receiving control signals from the gNB (i.e., gNB would know relay UE's Uu DRX configuration). Similarly, the relay UE (e.g., 704) may store active times for the relayed UE (e.g., 706) for receiving control signals, and vice-versa (i.e., relayed UE 706 would know active times for relay UE 704 for receiving control signal from relayed UE 706). However, under some operating environments, the gNB may not know the active times of the relay UE (e.g., 704) for receiving control signals from the relayed UE (e.g., 706), and the relayed UE may not know the relay UE's active times for receiving control signals from the gNB.

Figure 10:
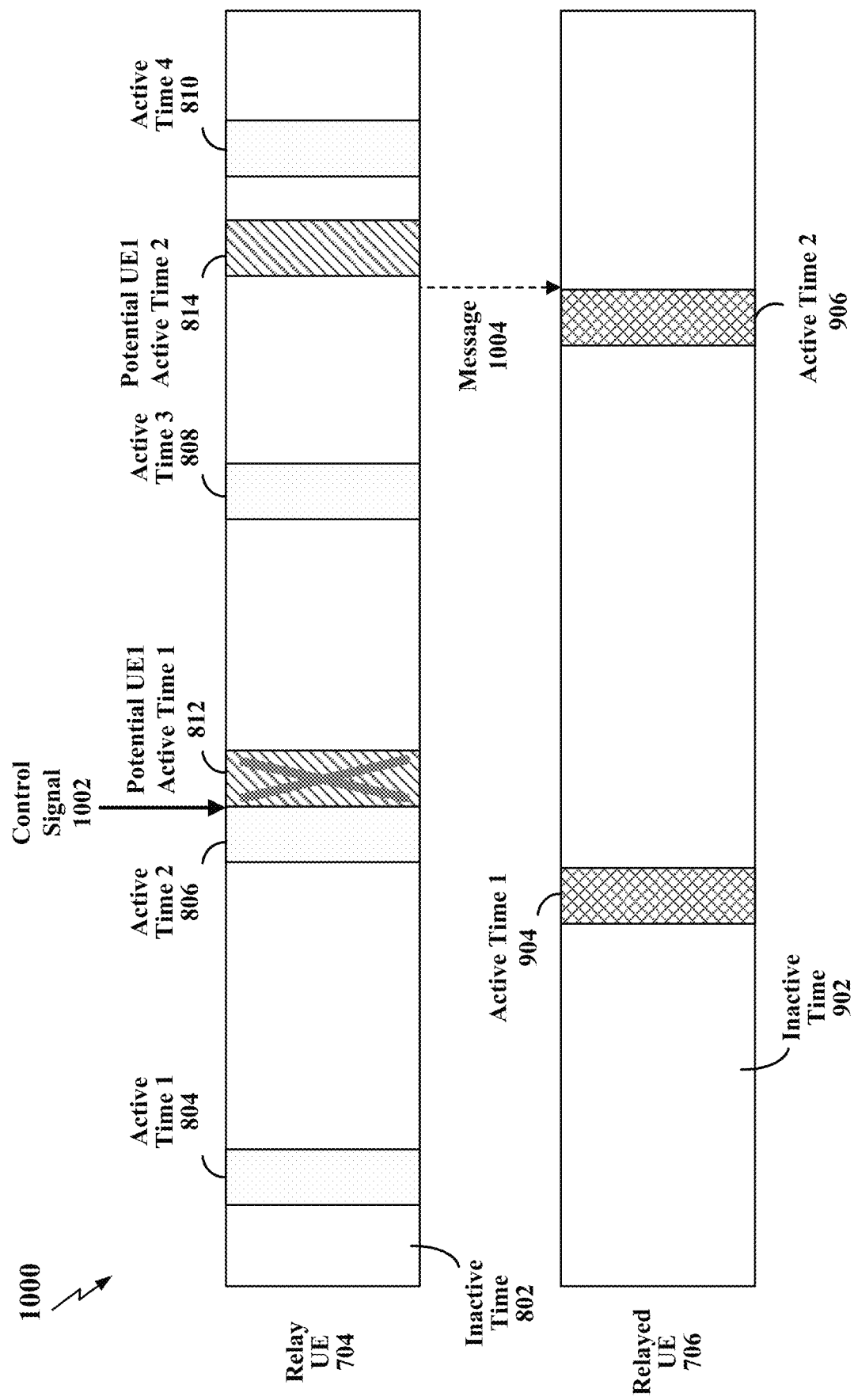
FIG. 10 shows a signal diagram illustrating active and inactive time periods during a DRX cycle for a relay UE and relayed UE according to some aspects.

FIG. 10 shows a signal diagram 1000 illustrating active and inactive time periods during a DRX cycle for a relay UE (e.g., 704) and relayed UE (e.g., 706) according to some aspects. Similar to the examples discussed above, the relay UE 704 may include inactive time 802, along with active times 804, 806, 808 and 810 in which the relay UE may monitor, for example, PDCCH from a gNB (e.g., 702). The relay UE may also be configured with potential active time periods 812, 814 for the relayed UE 706 for monitoring SCI from the relayed UE, for example, when the relayed UE 706 has uplink traffic for the relay UE 704 to transmit to the gNB (e.g., 702). In this example, after active time period 806, the relay UE 704 receives a control signal 1002 from the gNB that causes relay UE 704 to extend the Uu active time period to receive potential additional control signals, which in turn overlaps and cancels the potential relay UE active time 812 as shown in the figure.

The relay UE 704 is configured with an upcoming potential relay active time period 814, in which the relayed UE may receive SCI data from the relayed UE 706. In this example, the active time period 3 808 does not extend and overlap with active time period 814. In some examples, the relay UE 704 knows that active 808 does not overlap with active time period 814 because it has not received any control signal from gNb in active time 814, hence right before the relay active time period 814 begins (e.g., at least one time slot), the relay UE 704 transmits a message 1004 to the relayed UE 706 indicating the relay UE 704 will monitor for SCI from the relayed UE 706. In some examples, the message 1004 may include data indicating a duration (e.g., maximum duration) of the active time period 814, in order to mitigate the chances that active time period 814 extends and overlaps with active time 810.

In some examples, the relay UE (e.g., 704) may be configured with two DRX configurations. A first DRX configuration may include a Uu-based DRX, for example, to monitor PDCCH from the gNB. A second contemporaneous DRX configuration may be used in the relay UE 704 for sidelink communications, such as monitoring PSCCH from the relayed UE (e.g., 706). The relay UE 704 may be configured to send an indication message to the relayed UE 706 indicating that the relay UE 704 will monitor for PSCCH from the relayed UE 706 during a sidelink active time for the second DRX configuration. In some examples, the message may be transmitted at a configured time relative to the start of a sidelink relay active time (e.g., 814). The relayed UE 706 will transmit sidelink control to the relay UE 704 during a sidelink relay active time only if the relayed UE receives the message corresponding to the sidelink relay active time. The relayed UE 706 may also have a DRX configuration (e.g., 900) to specify active times when it will monitor for PSCCH from the relay UE 704.

Figure 11:
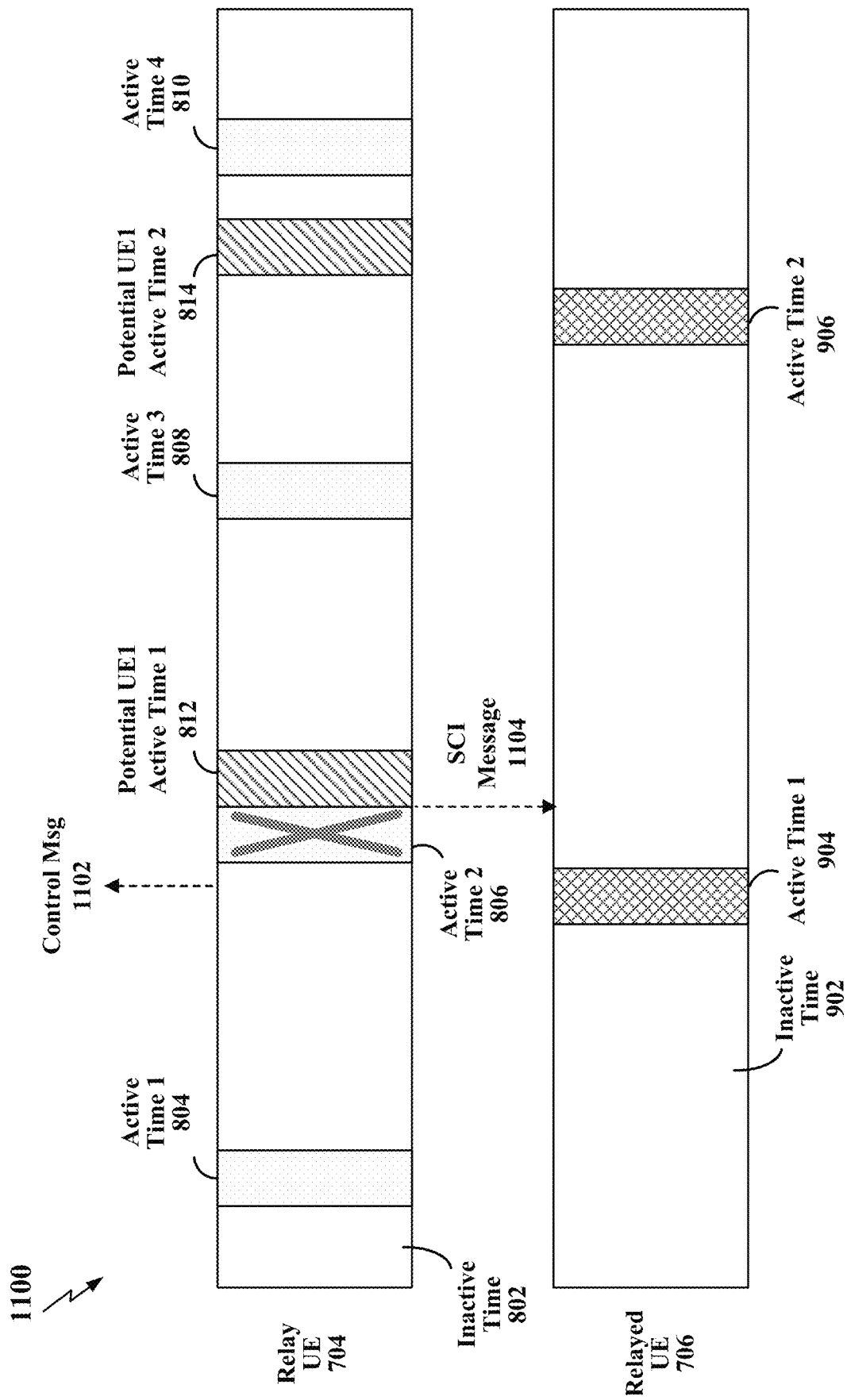
FIG. 11 shows another signal diagram illustrating active and inactive time periods during a DRX cycle for a relay UE and relayed UE according to some aspects.

FIG. 11 shows another signal diagram 1100 illustrating active and inactive time periods during a DRX cycle for a relay UE (e.g., 704) and relayed UE (e.g., 706) according to some aspects. Similar to the examples discussed above, the relay UE 704 may include inactive time 802, along with active times 804, 806, 808 and 810 in which the relay UE may monitor, for example, PDCCH from a gNB (e.g., 702). The relay UE may also be configured with potential active time periods 812, 814 for the relayed UE 706 for monitoring SCI from the UE, for example, when the relayed UE 706 has uplink traffic for the relay UE 704 to transmit to the gNB (e.g., 702). In this example, right before active time period 806 (e.g., at least one time slot) in which the relay UE 704 would receive DCI from the gNB 702, the relay UE 704 transmits a control message 1102 to the gNB 702 canceling the upcoming active time 806.

At this point, the relay UE 704 is configured with an upcoming potential relay active time period 812, in which the relayed UE may receive SCI data from the relayed UE 706. In some examples, right before the relay active time period 812 begins (e.g., at least one time slot), the relay UE 704 transmits a message 1104 to the relayed UE 706. In some examples, the message 1104 may include data indicating a duration (e.g., maximum duration) of the potential active time period 812, in order to mitigate that potential active time period 812 overlaps with active time 808.

Accordingly, the relay UE 704 may be configured with two DRX configurations. A first DRX configuration may include a Uu-based DRX, for example, to monitor PDCCH from the gNB. A second contemporaneous DRX configuration may be used in the relay UE 704 for sidelink communications, such as monitoring PSCCH from the relayed UE (e.g., 706). The relay UE 704 may be configured to send a message (e.g., 1104) to the relayed UE 706 indicating that the relay UE 704 will monitor for PSCCH from the relayed UE 706 during a sidelink active time for the DRX configuration. In some examples, the message may be transmitted at a configured time relative to the start of a sidelink relay active time (e.g., 812). The relayed UE 706 may also have a DRX configuration (e.g., 900) to specify active times when it will monitor for PSCCH from the relay UE 704.

Figure 12:
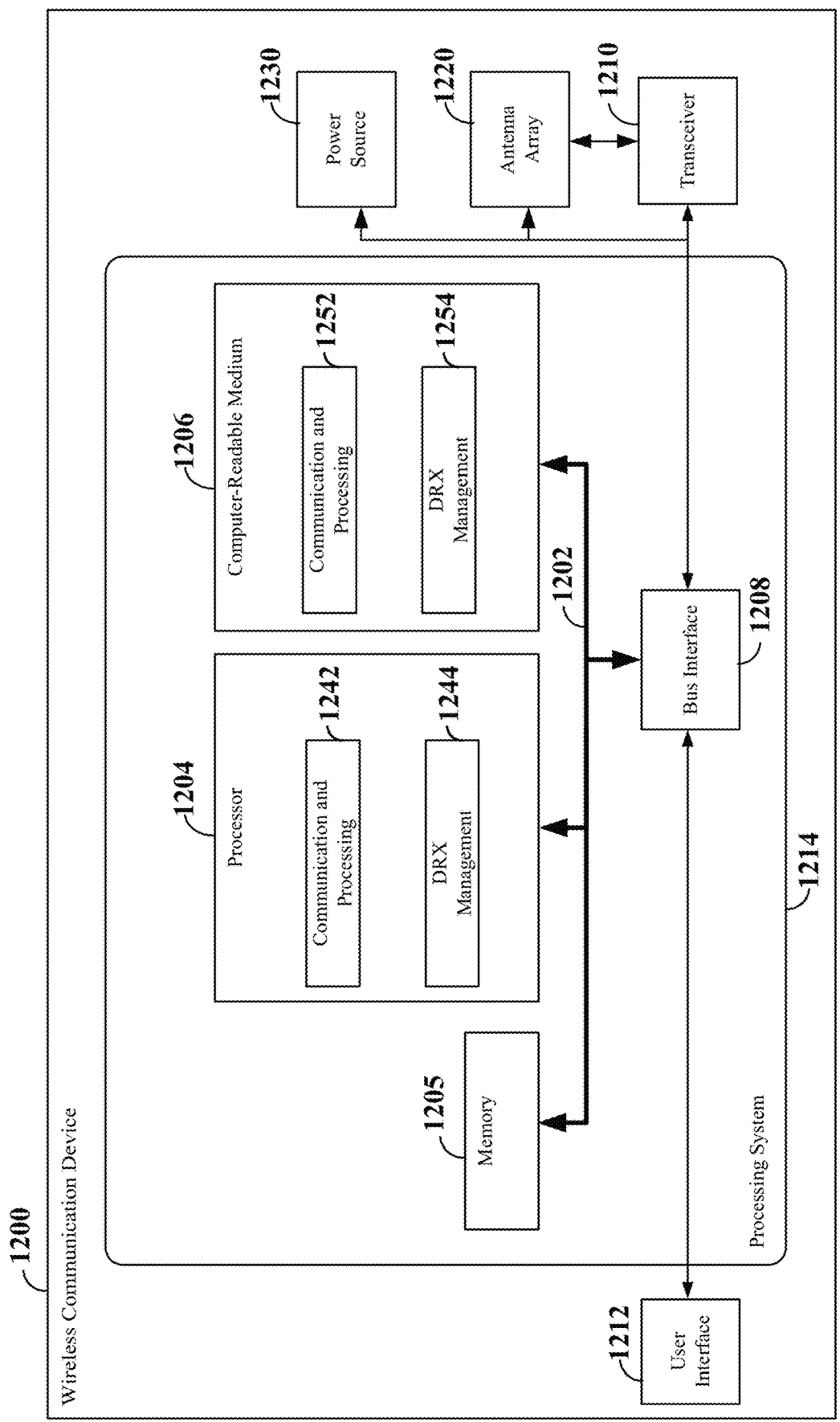
FIG. 12 is a conceptual diagram illustrating an example of a hardware implementation for an exemplary wireless communication device employing a processing system according to some aspects.

FIG. 12 is a conceptual diagram illustrating an example of a hardware implementation for an exemplary wireless communication device employing a processing system 1214. For example, the wireless communication device 1200 may be a UE or other scheduled entity as illustrated in any one or more of FIGS. 1, 2, and/or 7.

The wireless communication device 1200 may be implemented with a processing system 1214 that includes one or more processors 1204. Examples of processors 1204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1200 may be configured to perform any one or more of the functions described herein. That is, the processor 1204, as utilized in a wireless communication device 1200, may be used to implement any one or more of the processes described herein.

The processor 1204 may in some instances be implemented via a baseband or modem chip and in other implementations, the processor 1204 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1214 may be implemented with a bus architecture, represented generally by the bus 1202. The bus 1202 may include any number of interconnecting buses and bridges depending on the specific application of the processing system 1214 and the overall design constraints. The bus 1202 communicatively couples together various circuits including one or more processors (represented generally by the processor 1204), a memory 1205, and computer-readable media (represented generally by the computer-readable medium 1206). The bus 1202 may also link various other circuits such as timing sources, peripherals, voltage regulators, and power management circuits, which are well known in the art, and therefore, will not be described any further. A bus interface 1208 provides an interface between the bus 1202 and a transceiver 1210. The transceiver 1210 provides a means for communicating with various other apparatus over a transmission medium (e.g., air interface). A user interface 1212 (e.g., keypad, display, speaker, microphone, joystick) may also be provided.

The processor 1204 is responsible for managing the bus 1202 and general processing, including the execution of software stored on the computer-readable medium 1206. The software, when executed by the processor 1204, causes the processing system 1214 to perform the various functions described below for any particular apparatus, and also serve as means for performing the various functions described herein. The computer-readable medium 1206 and the memory 1205 may also be used for storing data that is manipulated by the processor 1204 when executing software.

One or more processors 1204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1206.

The computer-readable medium 1206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1206 may reside in the processing system 1214, external to the processing system 1214, or distributed across multiple entities including the processing system 1214. The computer-readable medium 1206 may be embodied in a computer program product. In some examples, the computer-readable medium 1206 may be part of the memory 1205. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1204 may include circuitry configured for various functions. For example, the processor 1204 may include communication and processing circuitry 1242, configured to communicate with one or more sidelink devices (e.g., other UEs) via respective sidelinks (e.g., PC5 interfaces). In addition, the communication and processing circuitry 1242 may be configured to communicate with a base station (e.g., gNB or eNB) via a Uu link. In some examples, the communication and processing circuitry 1242 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1242 may include one or more transmit/receive chains.

In some implementations where the communication involves receiving information, the communication and processing circuitry 1242 may obtain information from a component of the wireless communication device 1200 (e.g., from the transceiver 1210 that receives the information via radio frequency signaling or some other type of signaling suitable for the applicable communication medium), process (e.g., decode) the information, and output the processed information. For example, the communication and processing circuitry 1242 may output the information to another component of the processor 1204, to the memory 1205, or to the bus interface 1208. In some examples, the communication and processing circuitry 1242 may receive one or more of signals, messages, other information, or any combination thereof. In some examples, the communication and processing circuitry 1242 may receive information via one or more channels. In some examples, the communication and processing circuitry 1242 may include functionality for a means for receiving. In some examples, the communication and processing circuitry 1242 may include functionality for a means for processing, including a means for demodulating, a means for decoding, etc.

In some implementations where the communication involves sending (e.g., transmitting) information, the communication and processing circuitry 1242 may obtain information (e.g., from another component of the processor 1204, the memory 1205, or the bus interface 1208), process (e.g., modulate, encode, etc.) the information, and output the processed information. For example, the communication and processing circuitry 1242 may output the information to the transceiver 1210 (e.g., that transmits the information via radio frequency signaling or some other type of signaling suitable for the applicable communication medium). In some examples, the communication and processing circuitry 1242 may send one or more of signals, messages, other information, or any combination thereof. In some examples, the communication and processing circuitry 1242 may send information via one or more channels. In some examples, the communication and processing circuitry 1242 may include functionality for a means for sending (e.g., a means for transmitting). In some examples, the communication and processing circuitry 1242 may include functionality for a means for generating, including a means for modulating, a means for encoding, etc.

In some examples, the communication and processing circuitry 1242 may be configured to receive an indication of quasi co-location (QCL) information representative of a sidelink channel between the wireless communication device (e.g., a receiving UE) and another wireless communication device (e.g., a transmitting UE). The communication and processing circuitry 1242 may be configured to receive the indication of the QCL information via a sidelink radio resource control (RRC) message, a sidelink medium access control (MAC) control element (MAC-CE), or sidelink control information (SCI). In some examples, the communication and processing circuitry 1242 may further be configured to transmit a confirmation RRC message or a confirmation MAC-CE to the transmitting UE confirming receipt of the indication of the QCL information.

In some examples, the communication and processing circuitry 1242 may further be configured to receive a sidelink transmission (e.g., a PSSCH) from the transmitting UE. In some examples, the sidelink RRC message or sidelink MAC-CE. The communication and processing circuitry 1242 may further be configured to execute communication and processing instructions (software) 1252 stored in the computer-readable medium 1206 to implement one or more of the functions described herein.

The processor 1204 may further include DRX management circuitry 1244, configured to implement a DRX idle mode on the wireless communication device 1200. In the DRX idle mode, the DRX management circuitry 1244 can determine a DRX cycle including a DRX ON duration and a DRX OFF duration. Upon entering the DRX ON duration at a system time corresponding to a start of the DRX ON duration, the DRX management circuitry 1244 may be configured to wake-up the wireless communication device 1200. For example, the DRX management circuitry 1244 may be configured to control a power source 1230 to perform a power-up operation of one or more components of the wireless communication device 1200, such as the transceiver 1210 and antenna array 1220, to enable reception of the beam reference signals and/or a paging message in the DRX ON duration. At the end of the DRX ON duration at a system time corresponding to a start of the DRX OFF duration, the DRX management circuitry 1244 may further be configured to control the power source 1230 to perform a power-down operation of the one or more components of the wireless communication device 1200 to enter a sleep mode. DRX management circuitry 1244 may be further configured to manage a plurality of DRX cycles as described above in connection with FIGS. 8-11 and implement and/or assist in messaging (e.g., to a base station and/or a sidelink UE) to configure DRX active times during operation. The DRX circuitry 1244 may further be configured to execute DRX management software 1254 stored in the computer-readable medium 1206 to implement one or more of the functions described herein.

Figure 13:
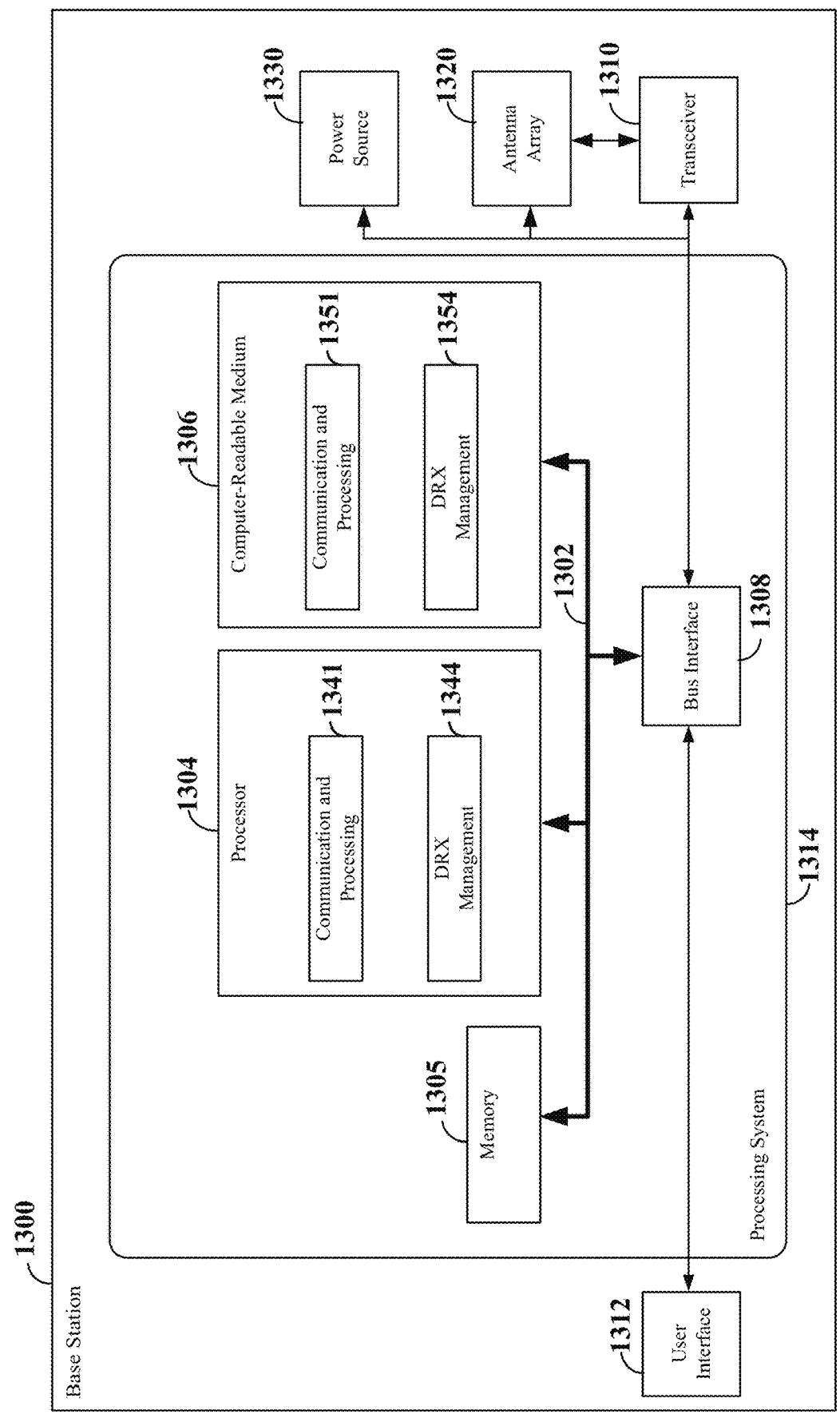
FIG. 13 is a conceptual diagram illustrating an example of a hardware implementation for base station (BS) employing a processing system according to some aspects.

FIG. 13 is a conceptual diagram illustrating an example of a hardware implementation for base station (BS) 1300 employing a processing system 1314. In some implementations, the BS 1300 may correspond to any of the BSs (e.g., gNBs) or scheduling entities shown in FIGS. 1, 2, 4, 5 and/or 7.

In accordance with various aspects of the disclosure, an element, or any portion of an element, or any combination of elements may be implemented with the processing system 1314. The processing system may include one or more processors 1304. The processing system 1314 may be substantially the same as the processing system 1314 illustrated in FIG. 13, including a bus interface 1308, a bus 1302, memory 1305, a processor 1304, and a computer-readable medium 1306. Furthermore, the BS 1300 may include an interface 1308 (e.g., a network interface) that provides a means for communicating with at least one other apparatus within a core network and with at least one radio access network.

The BS 1300 may be configured to perform any one or more of the operations described herein. In some aspects of the disclosure, the processor 1304, as utilized in the BS 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs.

The processor 1304 may be configured to schedule resources for the transmission of downlink reference signals (e.g., SSBs or CSI-RSs) on a plurality of downlink beams for a downlink beam sweep in accordance with a selected downlink beam sweep type and selected number of downlink reference signal resources indicated in a request for uplink beam refinement received from a UE. The processor 1304 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1304 may further be configured to schedule resources that may be utilized by the UE to transmit the request. For example, the resources may include resources scheduled for transmission of a PUCCH, PUSCH, PRACH occasion or RRC message.

In some aspects of the disclosure, the processor 1304 may include communication and processing circuitry 1341. The communication and processing circuitry 1341 may be configured to communicate with a UE, and may be configured similarly to communications and processing circuitry 1242 discussed above in connection with FIG. 12. The communication and processing circuitry 1341 may include one or more hardware components that provide the physical structure that performs various processes related to communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. The communication and processing circuitry 1341 may further be configured to execute communication and processing software 1351 included on the computer-readable medium 1306 to implement one or more functions described herein.

In some examples, the communication and processing circuitry 1341 may be configured to receive and process uplink beamformed signals at a mmWave frequency or a sub-6 GHz frequency via the transceiver 1310 and an antenna array 1320. For example, the communication and processing circuitry 1341 may be configured to receive a respective reference signal (e.g., SRS or DMRS) on each of a plurality of uplink beams from the UE during an uplink beam sweep. In some examples, the communication and processing circuitry 1341 may further be configured to generate and transmit downlink beamformed signals at a mmWave frequency or a sub-6 GHz frequency via the transceiver 1310 and the antenna array 1320. For example, the communication and processing circuitry 1341 may be configured to transmit a respective downlink reference signal (e.g., SSB or CSI-RS) on each of a plurality of downlink beams to the UE during a downlink beam sweep via at least one first antenna panel of the antenna array 1320.

The communication and processing circuitry 1341 may further be configured to receive a request from the UE. For example, the request may be included in a MAC-CE carried in a PUSCH, UCI in a PUCCH or PUSCH, a random-access message, or an RRC message. The communication and processing circuitry 1341 may further be configured to receive a scheduling request (e.g., via UCI in a PUCCH) from the UE for an uplink grant for the PUSCH carrying the MAC-CE. The communication and processing circuitry 1341 may further be configured to receive an uplink signal on one or more uplink receive beams via one or more uplink transmit beams applied to the uplink signal. For example, the communication and processing circuitry 1341 may be configured to receive the uplink signal on one or more uplink receive beams via at least one second antenna panel of the antenna array 1320. The uplink signal may include, for example, a PUCCH, PUSCH, SRS, DMRS, or PRACH.

The communication and processing circuitry 1341 may further be configured to control the antenna array 1320, transceiver 1310 and power source 1330 to generate a plurality of downlink transmit beams during a downlink beam sweep. In some implementations where the communication involves receiving information, the communication and processing circuitry 1341 may obtain information from a component of the BS 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 may include functionality for a means for receiving.

In some implementations where the communication involves sending (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 may include functionality for a means for sending (e.g., means for transmitting).

The processor 1304 may include DRX management circuitry 1344 configured to manage a plurality of DRX cycles as described above in connection with FIGS. 8-11 and to configure DRX active times and communication for one or more UEs during operation. The DRX management circuitry 1344 may further be configured to execute DRX management software 1354 stored in the computer-readable medium 1206 to implement one or more of the functions described herein.

Figure 14:
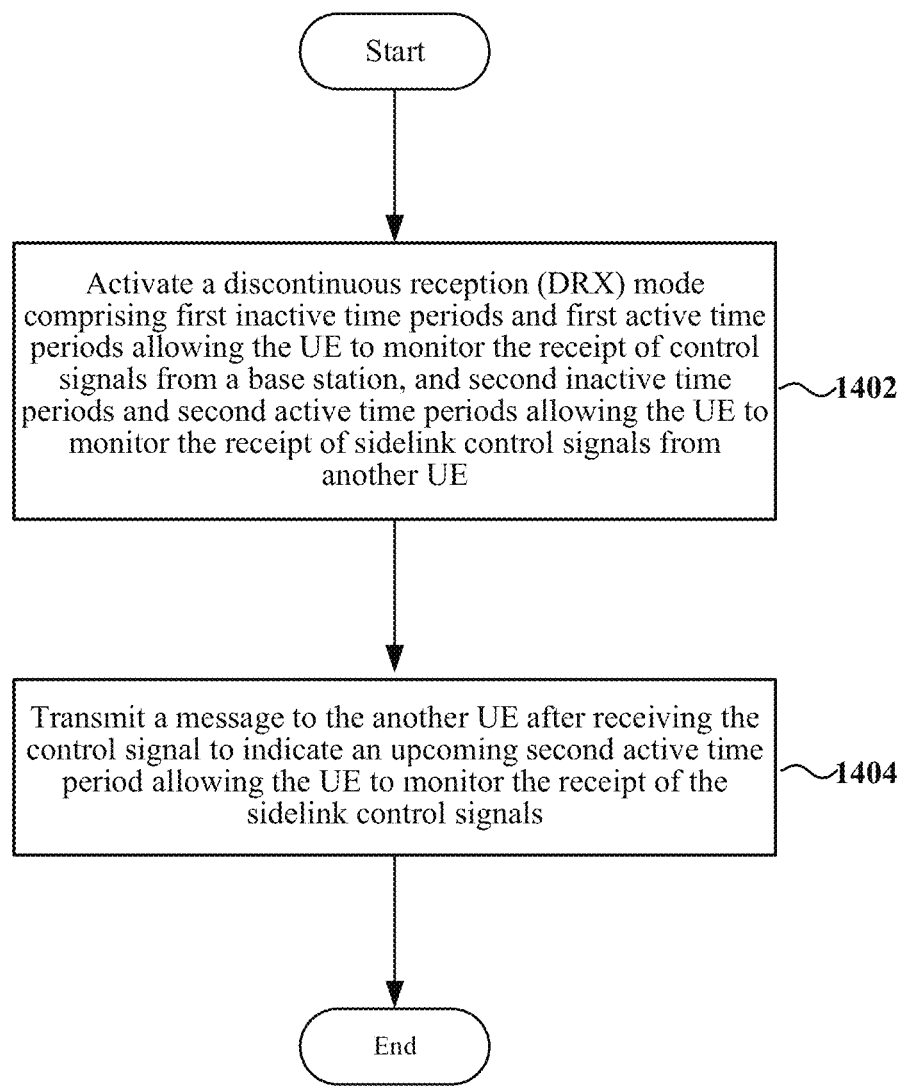
FIG. 14 is a flow chart of a method for DRX management for wireless communication in a UE according to some aspects.

FIG. 14 is a flow chart 1400 of a method for DRX management for wireless communication in a UE according to some aspects. As described below, some or all illustrated features may be omitted in a particular implementation within the scope of the present disclosure, and some illustrated features may not be required for implementation of all examples. In some examples, the method 1400 may be carried out by a scheduled entity (e.g., 1200). In some examples, the method 1400 may be carried out by any suitable apparatus or means for carrying out the functions or algorithms described below.

In block 1402, a UE (e.g., 704) may activate a discontinuous reception (DRX) mode comprising first inactive time periods and first active time periods (e.g., 804-810) allowing the UE to monitor the receipt of control messages from a base station (e.g., 702), and second inactive time periods and second active time periods (e.g., 812, 814) allowing the UE to monitor the receipt of sidelink control messages from another UE (e.g., 706). For example, the DRX management circuit 1244 shown and described in connection with FIG. 12 may provide a means for activating the DRX mode.

In some examples, the control messages from the base station may include Physical Downlink Control Channel (PDCCH) control messages. The PDCCH control messages may include downlink control information (DCI) messages. In some examples, the sidelink control messages may include Physical Sidelink Control Channel (PSCCH) control messages that may further include sidelink control information (SCI) messages.

In block 1404, the UE may transmit a message (e.g., 1004) to the another UE to indicate an upcoming second active time period allowing the UE to monitor the receipt of the sidelink control signals. For example, the communication and processing circuitry 1242 and DRX management circuit 1244 shown and described in connection with FIG. 12 may provide a means for transmitting the message to indicate an upcoming second active time period allowing the UE to monitor the receipt of the sidelink control signals.

In some examples, the UE may transmit the message to the another UE by transmitting the message at least one time slot before an upcoming second active time period. The transmitted message may include information indicating the duration of the upcoming second active time period. In some examples, the upcoming second active time period does not overlap with an upcoming inactive time period allowing the UE to monitor receipt of sidelink control messages from another UE. In some examples, the message may be transmitted at a configured time relative to the start of the second active time period.

Figure 15:
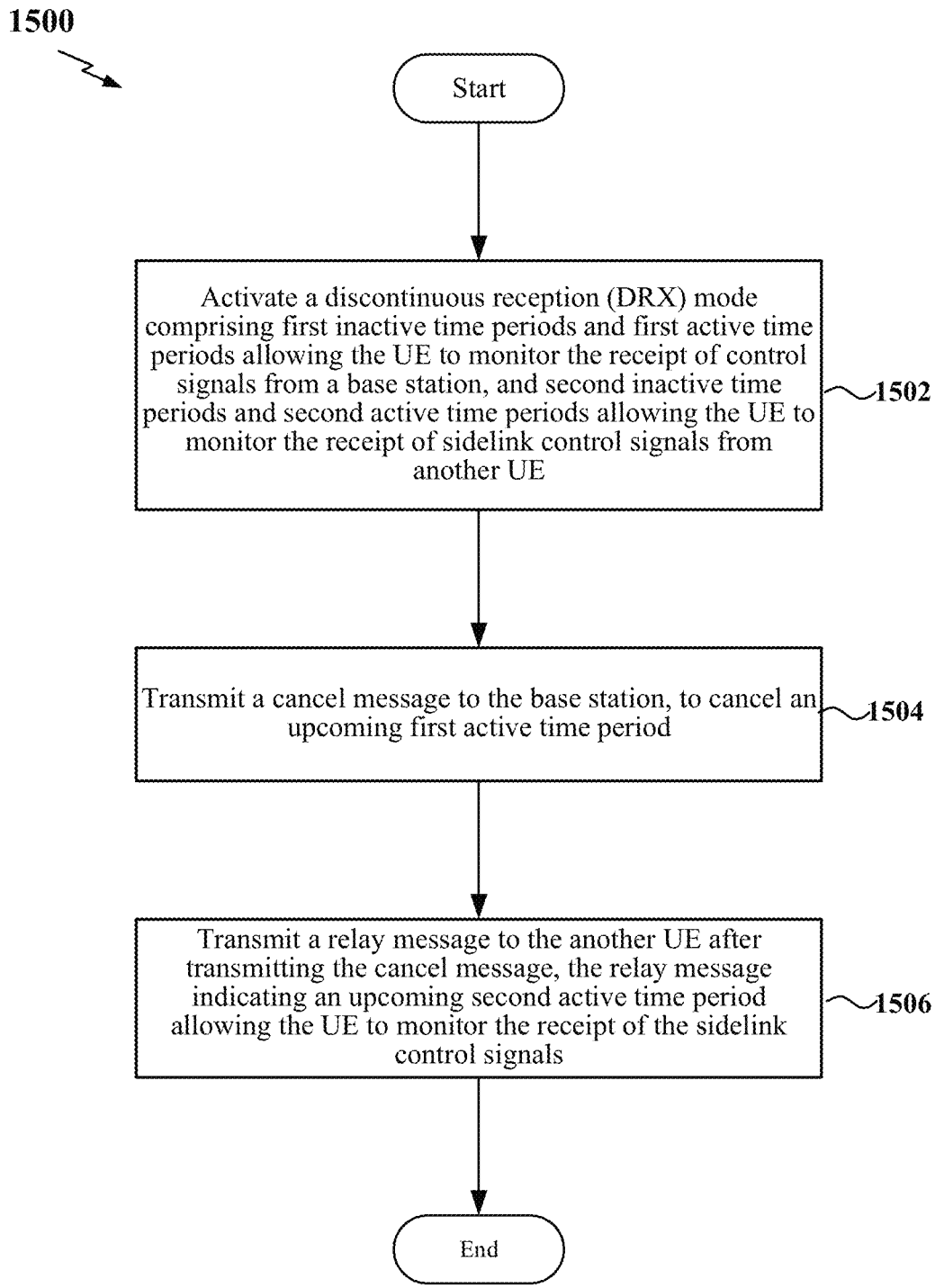
FIG. 15 is a flow chart of another method for DRX management for wireless communication in a UE according to some aspects.

FIG. 15 is a flow chart 1500 of another method for DRX management for wireless communication in a UE according to some aspects. As described below, some or all illustrated features may be omitted in a particular implementation within the scope of the present disclosure, and some illustrated features may not be required for implementation of all examples. In some examples, the method 1500 may be carried out by a scheduled entity (e.g., 1200). In some examples, the method 1500 may be carried out by any suitable apparatus or means for carrying out the functions or algorithms described below.

In block 1502, a UE (e.g., 704) may activate a discontinuous reception (DRX) mode comprising first inactive time periods and first active time periods (e.g., 804-810) allowing the UE to monitor the receipt of control signals from a base station (e.g., 702), and second inactive time periods and second active time periods (e.g., 812, 814) allowing the UE to monitor the receipt of sidelink control signals from another UE (e.g., 706). For example, the DRX management circuit 1244 shown and described in connection with FIG. 12 may provide a means for activating the DRX mode.

In block 1504, the UE (e.g., 704) transmits a cancellation message (e.g., 1102) to the base station, to cancel an upcoming first active time period (e.g., 806). For example, the communication and processing circuitry 1242 and DRX management circuitry 1244 shown and described in connection with FIG. 12 may provide a means for transmitting the cancellation message.

In block 1506, the UE may transmit a message (e.g., 1004) to the another UE after receiving the control message to indicate an upcoming second active time period (e.g., 812) allowing the UE to monitor the receipt of the sidelink control signals. For example, the communication and processing circuitry 1242 and DRX management circuitry 1244 shown and described in connection with FIG. 12 may provide a means for transmitting the message to the another UE after receiving the control signal. In some examples, the sidelink control message may be transmitted to the another UE at least one time slot before an upcoming second active time period. In some examples, the control messages from the base station may include Physical Downlink Control Channel (PDCCH) control messages that further include downlink control information (DCI) messages.

In some examples, the message transmitted to the another UE may include transmitting information indicating the duration of the upcoming second active time period. In some examples, the upcoming second active time period does not overlap with an upcoming inactive time period allowing the UE to monitor receipt of sidelink control messages from another UE. The sidelink control message may also be transmitted at a configured time relative to the start of the second active time period.

Figure 16:
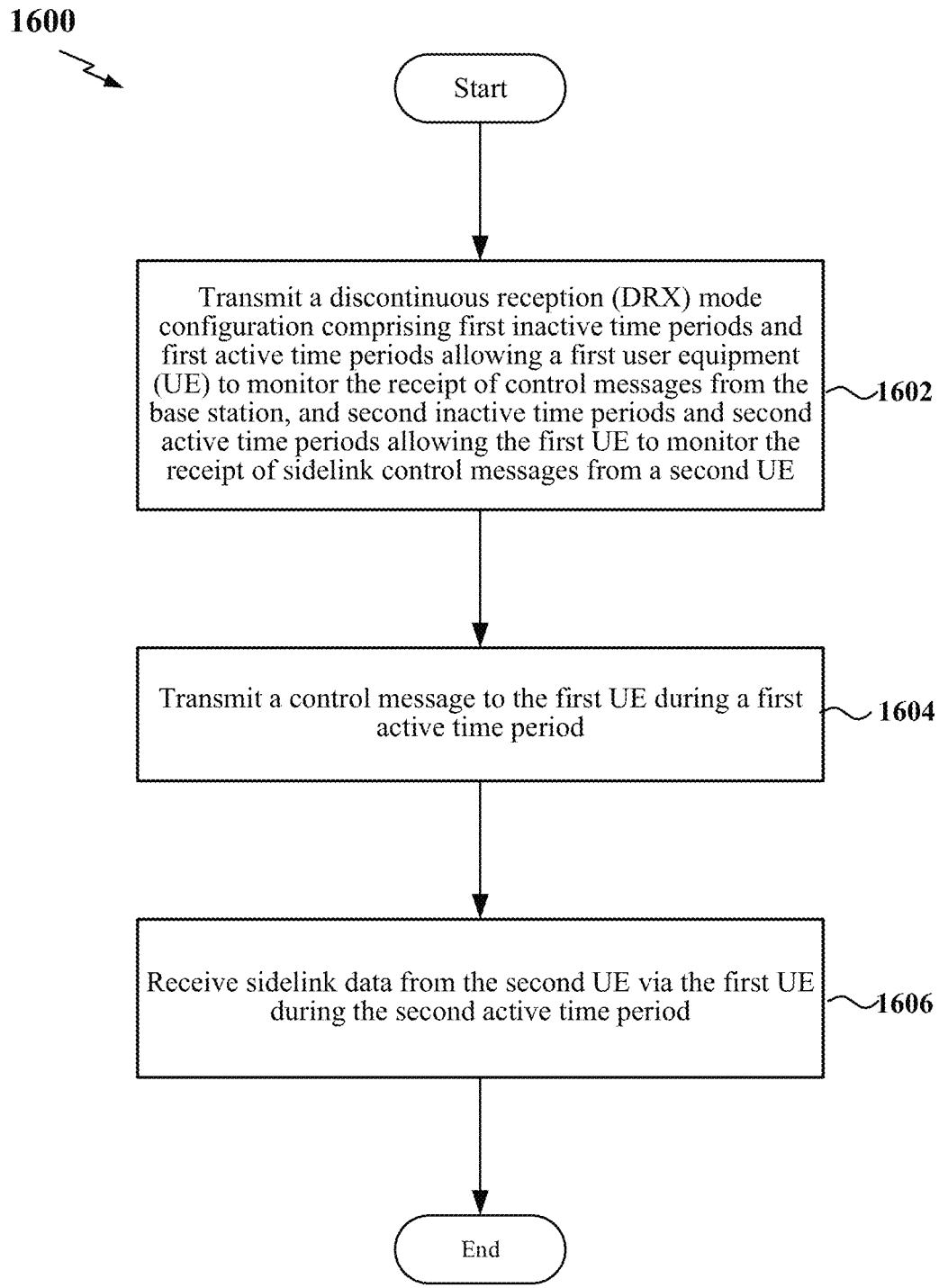
FIG. 16 is a flow chart 1600 of another method for DRX management for wireless communication in a base station according to some aspects.

FIG. 16 is a flow chart 1600 of another method for DRX management for wireless communication in a base station according to some aspects. As described below, some or all illustrated features may be omitted in a particular implementation within the scope of the present disclosure, and some illustrated features may not be required for implementation of all examples. In some examples, the method 1600 may be carried out by a scheduling entity (e.g., 1300). In some examples, the method 1600 may be carried out by any suitable apparatus or means for carrying out the functions or algorithms described below.

In block 1602, a base station (e.g., 702) may transmit a discontinuous reception (DRX) mode configuration comprising first inactive time periods and first active time periods (e.g., 804-810) allowing a first user equipment (UE) (e.g., 704) to monitor the receipt of control messages from the base station, and second inactive time periods and second active time periods allowing the first UE to monitor the receipt of sidelink control messages from a second UE (e.g., 706). For example, the communication and processing circuitry 1341 and DRX management circuitry 1344 shown and described in connection with FIG. 13 may provide a means for transmitting the DRX mode.

In block 1504, the base station (e.g., 702) may transmit a control message to the first UE during a first active time period. For example, the communication and processing circuitry 1341 and DRX management circuitry 1344 shown and described in connection with FIG. 13 may provide a means for transmitting the control message.

In block 1606, the base station may receive sidelink data from the second UE (e.g., 706) via the first UE (e.g., 704) during the second active time period. For example, the communication and processing circuitry 1341 shown and described in connection with FIG. 13 may provide a means for receiving sidelink data from the second UE via the first UE. In some examples, the control message may include a Physical Downlink Control Channel (PDCCH) control message that includes a downlink control information (DCI) message. In some examples, the sidelink control messages may include Physical Sidelink Control Channel (PSCCH) control messages that may include sidelink control information (SCI) messages.

In some examples, the control message may include an upcoming second active time period that does not overlap with an upcoming inactive time period allowing the first UE to monitor receipt of sidelink control messages from the second UE. In some examples, the base station may receive a cancel message from the first UE, to cancel an upcoming active time period prior to transmitting the control message.

The processes shown in FIGS. 14-16 may include additional aspects, such as any single aspect or any combination of aspects described below and/or in connection with one or more other processes described elsewhere herein.

The following provides an overview of examples of the present disclosure.

Example 1: A user equipment (UE), comprising: a wireless transceiver; a memory; and a processor communicatively coupled to the wireless transceiver and the memory, wherein the processor and the memory are configured to activate a discontinuous reception (DRX) mode comprising first inactive time periods and first active time periods wherein the UE is configured to monitor a receipt of control messages from a base station during the first active time periods, and second inactive time periods and second active time periods wherein the UE is configured to monitor a receipt of sidelink control messages from another UE during the second active time periods; and transmit a message to the another UE to indicate the upcoming second active time period allowing the UE to monitor the receipt of the sidelink control messages.

Example 2: The UE of example 1, wherein the processor and the memory are configured to transmit the message to the another UE by transmitting the message at least one time slot before an upcoming second active time period.

Example 3: The UE of any of examples 1 and/or 2, wherein the control messages from the base station comprise Physical Downlink Control Channel (PDCCH) control messages, wherein the PDCCH control messages comprise downlink control information (DCI) messages.

Example 4: The UE of any of examples 1 through 3, wherein the processor and the memory are configured to transmit a cancel message to the base station, to cancel an upcoming first active time period, and wherein the message to the another UE to indicate an upcoming second active time period is transmitted after the cancel message is transmitted.

Example 5: The UE of any of examples 1 through 4, wherein the sidelink control messages comprise Physical Sidelink Control Channel (PSCCH) control messages.

Example 6: The UE of any of examples 1 through 5, wherein the PSCCH control messages comprise sidelink control information (SCI) messages.

Example 7: The UE of any of examples 1 through 6, wherein the processor and the memory are configured to transmit the message to the another UE by transmitting information indicating the duration of the upcoming second active time period.

Example 8: The UE of any of examples 1 through 7, wherein the upcoming second active time period does not overlap with an upcoming inactive time period allowing the UE to monitor receipt of sidelink control messages from another UE.

Example 9: The UE of any of examples 1 through 8, wherein the processor and the memory are configured to transmit the message at a configured time relative to a start of the second active time period.

Example 10: A method for operating a user equipment (UE), comprising: activating a discontinuous reception (DRX) mode comprising first inactive time periods and first active time periods wherein the UE is configured to monitor a receipt of control messages from a base station during the first active time periods, and second inactive time periods and second active time periods wherein the UE is configured to monitor a receipt of sidelink control messages from another UE during the second active time periods; and transmitting a message to the another UE to indicate the upcoming second active time period allowing the UE to monitor the receipt of the sidelink control messages.

Example 11: The method of example 10, wherein transmitting the message to the another UE comprises transmitting the message at least one time slot before an upcoming second active time period.

Example 12: The method of examples 10 and/or 11, wherein the control messages from the base station comprise Physical Downlink Control Channel (PDCCH) control messages, wherein the PDCCH control messages comprise downlink control information (DCI) messages.

Example 13: The method of any of examples 10 through 12, further comprising transmitting a cancel message to the base station to cancel an upcoming first active time period, and wherein transmitting the message to the another UE to indicate an upcoming second active time period comprises transmitting the message after the cancel message is transmitted.

Example 14: The method of any of examples 10 through 13, wherein the sidelink control messages comprise Physical Sidelink Control Channel (PSCCH) control messages.

Example 15: The method of any of examples 10 through 14, wherein the PSCCH control messages comprise sidelink control information (SCI) messages.

Example 16: The method of any of examples 10 through 15, wherein transmitting the message to the another UE comprises transmitting information indicating the duration of the upcoming second active time period.

Example 17: The method of any of examples 10 through 162, wherein the upcoming second active time period does not overlap with an upcoming inactive time period allowing the UE to monitor receipt of sidelink control messages from another UE.

Example 18: The method of any of examples 10 through 17, wherein transmitting the message comprises transmitting the message at a configured time relative to a start of the second active time period.

Example 19: A user equipment (UE), comprising: a wireless transceiver; a memory; and a processor communicatively coupled to the wireless transceiver and the memory, wherein the processor and the memory are configured to activate a discontinuous reception (DRX) mode comprising first inactive time periods and first active time periods, wherein the UE can communicate sidelink control messages to another UE during the first active time periods; receive a sidelink control message from the another UE indicating an upcoming second active time period and second active time period duration for the another UE; and transmit the sidelink control messages to the another UE during the second active time period duration and a corresponding active time period of the UE.

Example 20: The UE of example 19, wherein the processor and memory are configured to receive the message by receiving data indicating a duration of the upcoming second time period.

Example 21: The UE of examples 19 and/or 20, wherein the sidelink control messages comprise Physical Sidelink Control Channel (PSCCH) control messages.

Example 22: The UE of any of example 19 through 21, wherein the PSCCH control messages comprise sidelink control information (SCI) messages.

Example 23: The UE of any of example 19 through 22, wherein the upcoming second active time period does not overlap with an upcoming second inactive time period allowing the UE to monitor a receipt of sidelink control messages from another UE.

Example 24: A base station, comprising: a wireless transceiver; a memory; and a processor communicatively coupled to the wireless transceiver and the memory, wherein the processor and the memory are configured to transmit a discontinuous reception (DRX) mode configuration comprising first inactive time periods and first active time periods allowing a first user equipment (UE) to monitor a receipt of control messages from the base station, and second inactive time periods and second active time periods allowing the first UE to monitor a receipt of sidelink control messages from a second UE; transmit a control message to the first UE during a first active time period; and receive sidelink data from the second UE via the first UE during the second active time period.

Example 25: The base station of example 24, wherein the control message comprises a Physical Downlink Control Channel (PDCCH) control message.

Example 26: The base station of examples 24 and/or 25, wherein the PDCCH control message comprises a downlink control information (DCI) message.

Example 27: The base station of any of examples 24 through 26, wherein the sidelink control messages comprise Physical Sidelink Control Channel (PSCCH) control messages.

Example 28: The base station of any of examples 24 through 27, wherein the PSCCH control messages comprise sidelink control information (SCI) messages.

Example 29: The base station of claim 24, wherein the control message comprises an upcoming second active time period that does not overlap with an upcoming inactive time period allowing the first UE to monitor receipt of sidelink control messages from the second UE.

Example 30: The base station of any of examples 24 through 29, wherein the processor and memory are configured to receive a cancel message from the first UE, to cancel an upcoming active time period prior to transmitting the control message.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, 7 and 12-13 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
a wireless transceiver;
a memory; and
a processor communicatively coupled to the wireless transceiver and the memory, wherein the processor and the memory are configured to
activate a discontinuous reception (DRX) mode comprising first inactive time periods and first active time periods wherein the UE is configured to monitor a receipt of control messages from a base station during the first active time periods, and second inactive time periods and second active time periods wherein the UE is configured to monitor a receipt of sidelink control messages from another UE during the second active time periods; and
transmit a message to the another UE to indicate an upcoming second active time period allowing the UE to monitor the receipt of the sidelink control messages from the another UE, wherein the upcoming second active time period is configured to not overlap with the first active time periods.

2. The UE of claim 1, wherein the processor and the memory are configured to transmit the message to the another UE by transmitting the message at least one time slot before the upcoming second active time period.

3. The UE of claim 1, wherein the control messages from the base station comprise Physical Downlink Control Channel (PDCCH) control messages, wherein the PDCCH control messages comprise downlink control information (DCI) messages.

4. The UE of claim 1, wherein the processor and the memory are configured to transmit a cancel message to the base station, to cancel an upcoming first active time period, and wherein the message to the another UE to indicate an upcoming second active time period is transmitted after the cancel message is transmitted.

5. The UE of claim 1, wherein the sidelink control messages comprise Physical Sidelink Control Channel (PSCCH) control messages.

6. The UE of claim 5, wherein the PSCCH control messages comprise sidelink control information (SCI) messages.

7. The UE of claim 1, wherein the processor and the memory are configured to transmit the message to the another UE by transmitting information indicating the duration of the upcoming second active time period.

8. The UE of claim 1, wherein the upcoming second active time period does not overlap with an upcoming inactive time period allowing the UE to monitor receipt of sidelink control messages from another UE.

9. The UE of claim 1, wherein the processor and the memory are configured to transmit the message at a configured time relative to a start of the second active time period.

10. A method for operating a user equipment (UE), comprising:
   activating a discontinuous reception (DRX) mode comprising
      first inactive time periods and first active time periods wherein the UE is configured to monitor a receipt of control messages from a base station during the first active time periods, and
      second inactive time periods and second active time periods wherein the UE is configured to monitor a receipt of sidelink control messages from another UE during the second active time periods; and
   transmitting a message to the another UE to indicate an upcoming second active time period allowing the UE to monitor the receipt of the sidelink control messages from the another UE, wherein the upcoming second active time period is configured to not overlap with the first active time periods.

11. The method of claim 10, wherein transmitting the message to the another UE comprises transmitting the message at least one time slot before the upcoming second active time period.

12. The method of claim 10, wherein the control messages from the base station comprise Physical Downlink Control Channel (PDCCH) control messages, wherein the PDCCH control messages comprise downlink control information (DCI) messages.

13. The method of claim 10, further comprising transmitting a cancel message to the base station to cancel an upcoming first active time period, and wherein transmitting the message to the another UE to indicate the upcoming second active time period comprises transmitting the message after the cancel message is transmitted.

14. The method of claim 10, wherein the sidelink control messages comprise Physical Sidelink Control Channel (PSCCH) control messages.

15. The method of claim 14, wherein the PSCCH control messages comprise sidelink control information (SCI) messages.

16. The method of claim 10, wherein transmitting the message to the another UE comprises transmitting information indicating the duration of the upcoming second active time period.

17. The method of claim 10, wherein the upcoming second active time period does not overlap with an upcoming inactive time period allowing the UE to monitor receipt of sidelink control messages from another UE.

18. The method of claim 10, wherein transmitting the message comprises transmitting the message at a configured time relative to a start of the second active time period.

19. A user equipment (UE), comprising:
   a wireless transceiver;
   a memory; and
   a processor communicatively coupled to the wireless transceiver and the memory, wherein the processor and the memory are configured to
      activate a discontinuous reception (DRX) mode comprising first inactive time periods and first active time periods, wherein the UE can communicate sidelink control messages to another UE during the first active time periods;
      receive a sidelink control message from the another UE indicating an upcoming second active time period and second active time period duration for the another UE, the second active time period duration being configured to not overlap with active time periods for the another UE to monitor a receipt of control messages from a base station; and
      transmit the sidelink control messages to the another UE during the second active time period duration and a corresponding active time period of the UE.

20. The UE of claim 19, wherein the processor and memory are configured to receive the message by receiving data indicating a duration of the upcoming second time period.

21. The UE of claim 19, wherein the sidelink control messages comprise Physical Sidelink Control Channel (PSCCH) control messages.

22. The UE of claim 21, wherein the PSCCH control messages comprise sidelink control information (SCI) messages.

23. The UE of claim 19, wherein the upcoming second active time period does not overlap with an upcoming second inactive time period allowing the UE to monitor a receipt of sidelink control messages from another UE.

24. A base station, comprising:
   a wireless transceiver;
   a memory; and
   a processor communicatively coupled to the wireless transceiver and the memory, wherein the processor and the memory are configured to
      transmit a discontinuous reception (DRX) mode configuration comprising first inactive time periods and first active time periods allowing a first user equipment (UE) to monitor a receipt of control messages from the base station, and second inactive time periods and second active time periods allowing the first UE to monitor a receipt of sidelink control messages from a second UE;
      transmit a control message to the first UE during a first active time period; and
      receive sidelink data from the second UE via the first UE during the second active time period, wherein the second active time period does not overlap with the first active time period.

25. The base station of claim 24, wherein the control message comprises a Physical Downlink Control Channel (PDCCH) control message.

26. The base station of claim 25, wherein the PDCCH control message comprises a downlink control information (DCI) message.

27. The base station of claim 24, wherein the sidelink control messages comprise Physical Sidelink Control Channel (PSCCH) control messages.

28. The base station of claim 24, wherein the PSCCH control messages comprise sidelink control information (SCI) messages.

29. The base station of claim 24, wherein the control message comprises an upcoming second active time period that does not overlap with an upcoming inactive time period allowing the first UE to monitor receipt of sidelink control messages from the second UE.

30. The base station of claim 24, wherein the processor and memory are configured to receive a cancel message from the first UE, to cancel an upcoming active time period prior to transmitting the control message.

* * * * *